(12) United States Patent
Teramachi

(10) Patent No.: US 7,320,546 B2
(45) Date of Patent: Jan. 22, 2008

(54) ROLLING GUIDE APPARATUS

(76) Inventor: Hiroshi Teramachi, 3-12-30-301, Kamiosaki, Shinagawa-ku, Tokyo (JP)

( * ) Notice: Subject to any disclaimer, the term of this patent is extended or adjusted under 35 U.S.C. 154(b) by 329 days.

(21) Appl. No.: 10/620,250

(22) Filed: Jul. 15, 2003

(65) Prior Publication Data
US 2004/0151409 A1 Aug. 5, 2004

(30) Foreign Application Priority Data
Jul. 15, 2002 (JP) ............................. 2002-237675

(51) Int. Cl.
*F16C 29/06* (2006.01)
(52) U.S. Cl. ......................................... 384/45; 384/43
(58) Field of Classification Search ............ 384/43–45, 384/53–59, 48–49, 9, 13, 15, 36; 238/164; 104/106, 107
See application file for complete search history.

(56) References Cited

U.S. PATENT DOCUMENTS

| | | | | |
|---|---|---|---|---|
| 1,178,196 A | * | 4/1916 | Willard | 104/107 |
| 4,692,039 A | * | 9/1987 | Teramachi | 384/45 |
| 5,005,987 A | * | 4/1991 | Morita | 384/43 |
| 5,273,365 A | * | 12/1993 | Kondoh | 384/44 |
| 6,109,789 A | * | 8/2000 | Chen | 384/48 |
| 6,312,158 B1 | * | 11/2001 | Teramachi et al. | 384/36 |
| 6,327,929 B1 | * | 12/2001 | Yanagisawa | 74/490.09 |
| 6,488,411 B2 | * | 12/2002 | Michioka et al. | 384/45 |

FOREIGN PATENT DOCUMENTS

JP 2000-291653 10/2000

* cited by examiner

*Primary Examiner*—Thomas R. Hannon
*Assistant Examiner*—Justin Krause
(74) *Attorney, Agent, or Firm*—Burr & Brown

(57) ABSTRACT

A rolling guide apparatus is provided which is reduced in size and weight, and which includes a track rail of a flexible structure of course having a function of absorbing an impact load and capable of automatically adjusting an error between mounting surfaces of the track rail and a movable block. The apparatus includes a track rail 10 with projected portions 12 projecting to the left and right, a movable block 30 having at least four sets of endlessly circulating roller rows 20 built therein which are in rolling contact with upper and lower surfaces of the left and right projected portions 12 of the track rail 10. The track rail 10 is characterized in that it has an elastically deformable flexible structure including a thin central plate portion 11 being elastically deformable to the left or right, thin left and right projected portions 12, 12 projecting to the left and right from an upper end portion of the central plate portion 11 and being flexibly deformable in a vertical direction, and fixed plate portions 13, 13 projecting to the left and right from a lower end portion of the central plate portion 11.

9 Claims, 25 Drawing Sheets

ROLLING GUIDE APPARATUS

BACKGROUND OF THE INVENTION

1. Field of the Invention

The present invention relates to a rolling guide apparatus suitable for use as, for example, a rolling guide having a mounting surface of poor accuracy for an aseismatic or quake-free device of a relatively small-scale building, or for use as a rolling guide adapted to be mounted on a part or object which is moving at high speed, such as a motor vehicle, an airplane or the like, and which can be deformed at any time due to a shock or impact applied thereto.

2. Description of the Related Art

Conventional rolling guide apparatuses are mainly used for linear guiding parts of a machine tool to achieve guidance with high accuracy while supporting heavy loads by their highly rigid structures.

In contrast to this, the inventor has already proposed a roller guide apparatus in Japanese patent application laid-open No. 2000-291653 (see FIG. 25), which comprises a track rail 1000 provided with projected portions 1020, 1020 projecting laterally or to the left and right from a rail base portion 1010 of high rigidity, and a movable block 3000 having at least four sets of endlessly circulating roller rows 2000 built therein which are in rolling contact with the upper and lower surfaces of the left and right projected portions 1020, 1020 of the track rail 1000, wherein when an impact or shock load acts on the apparatus in a vertical direction, the impact or shock load acting on rolling members is absorbed by elastic deformation of the projected portions 1020, 1020 in such a manner that an impact of 3G is reduced to about 2G, for instance.

The track rail projected portions 1020 are each of a circular arc shape, and barrel-shaped rollers 2001 are used for the endlessly circulating roller rows 2000 which are in contact with the upper side circular-arc concave surfaces, and hourglass-shaped rollers 2002 are used for the endlessly circulating roller rows 2000 which are in contact with the lower side circular-arc convex surfaces, thereby ensuring self-aligning capability of the apparatus to permit the barrel-shaped and hourglass-shaped rollers to slip sideways along the circular arc shapes of the track rail projected portions 1020, respectively.

However, the above-mentioned conventional rolling guide apparatus includes the thick and highly rigid rail base portion 1010 and is heavy in weight, so there has been a problem that such a rolling guide apparatus is not suitable for use with motor vehicles, aircrafts and the like requiring weight reduction, and hence the applications of use thereof are limited.

In addition, though shock or impact can be absorbed by the elastic deformation of the track rail projected portions 1020, such shock or impact is assumed to be an impulsive or severe up-and-down shake of a massive earthquake, and hence the conventional rolling guide apparatus basically has high rigidity, and the projected portions 1020 can be elastically deformed only when subjected to a large shock or impact load.

Moreover, even if it is said that the apparatus has self-aligning capability, the movable block 3000 is swung along the circular arc shapes of the track rail projected portions 1020, so that a parallelism error between a mounting surface of the movable block 3000 and a mounting surface of the track rail 1000 can only be absorbed, but a lateral or transverse error of the mounting surface of the track rail 1000, a parallelism error in the vertical direction, etc., can not be accommodated. Accordingly, some. degree of accuracy is needed for the mounting surfaces, and hence the fields of use of the apparatus are limited.

The present invention has been made to solve the problems as referred to above, and is intended to provide a rolling guide apparatus which is reduced in size and weight, but of course has the function of absorbing shock or impact load, and which is provided with a track rail of a flexible structure capable of automatically adjusting an error between the mounting surfaces of the track rail and a movable block.

SUMMARY OF THE INVENTION

In order to achieve the above-mentioned object, the present invention resides in a rolling guide apparatus including a track rail with projected portions projecting to the left and right, and a movable block having at least four sets of endlessly circulating rolling member rows built therein which are in rolling contact with upper and lower surfaces of the left and right projected portions of the track rail, characterized in that the track rail has an elastically deformable flexible structure comprising; a thin central plate portion being elastically deformable to the left or right; the thin projected portions projecting to the left and right from an upper end portion of the central plate portion and being flexibly deformable in a vertical direction; and fixed plate portions projecting to the left and right from a lower end portion of the central plate portion.

The track rail is characterized in that it is formed by welding together back sides of bottom plate portions of a pair of rail members each having a channel-shaped cross sectional configuration.

The track rail is characterized in that it is formed into an integral structure by drawing.

The track rail is characterized in that it comprises a cover plate molded from precision sheet steel into a circular arc shape and a base member welded by electrodeposition to the cover plate; and that the thin left and right projected portions being flexibly deformable in a vertical direction are formed by the cover plate; and that the central plate portion and the fixed plate portions are formed by the base member.

It is characterized in that rolling guide apparatuses, as referred to above, are arranged in a vertically opposite relation with respect to each other with their respective track rails being disposed orthogonal to each other, the two movable blocks being coupled with each other in back-to-back contact to form an integral structure so as to be movable in two axial directions.

The track rail may be a rectilinear rail or a curvilinear rail curving in a vertical direction.

Preferably, all the rolling members of the four sets of endlessly circulating rolling member rows comprise balls alone.

Moreover, in cases where the apparatus is subjected to a heavy load, two left and right rows of endlessly circulating rolling members located at an upper side of the projected portions comprise rollers having their rolling face portions of a circular arc configuration, and the rolling members located at a lower side of the projected portions comprise balls. In this case, it is preferable to use a track rail of a drawn structure with relatively high rigidity.

The combination of rolling members and track rails can be selected in accordance with the application of use, the magnitude of a load applied, etc.

Furthermore, it is characterized in that upper and lower track rails are fixedly secured to the centers of mounting plates, respectively, to form a unit, with the end portions of the mounting plates being fixed to counterpart mounting surfaces.

DESCRIPTION OF THE PREFERRED EMBODIMENT

Figure 1:
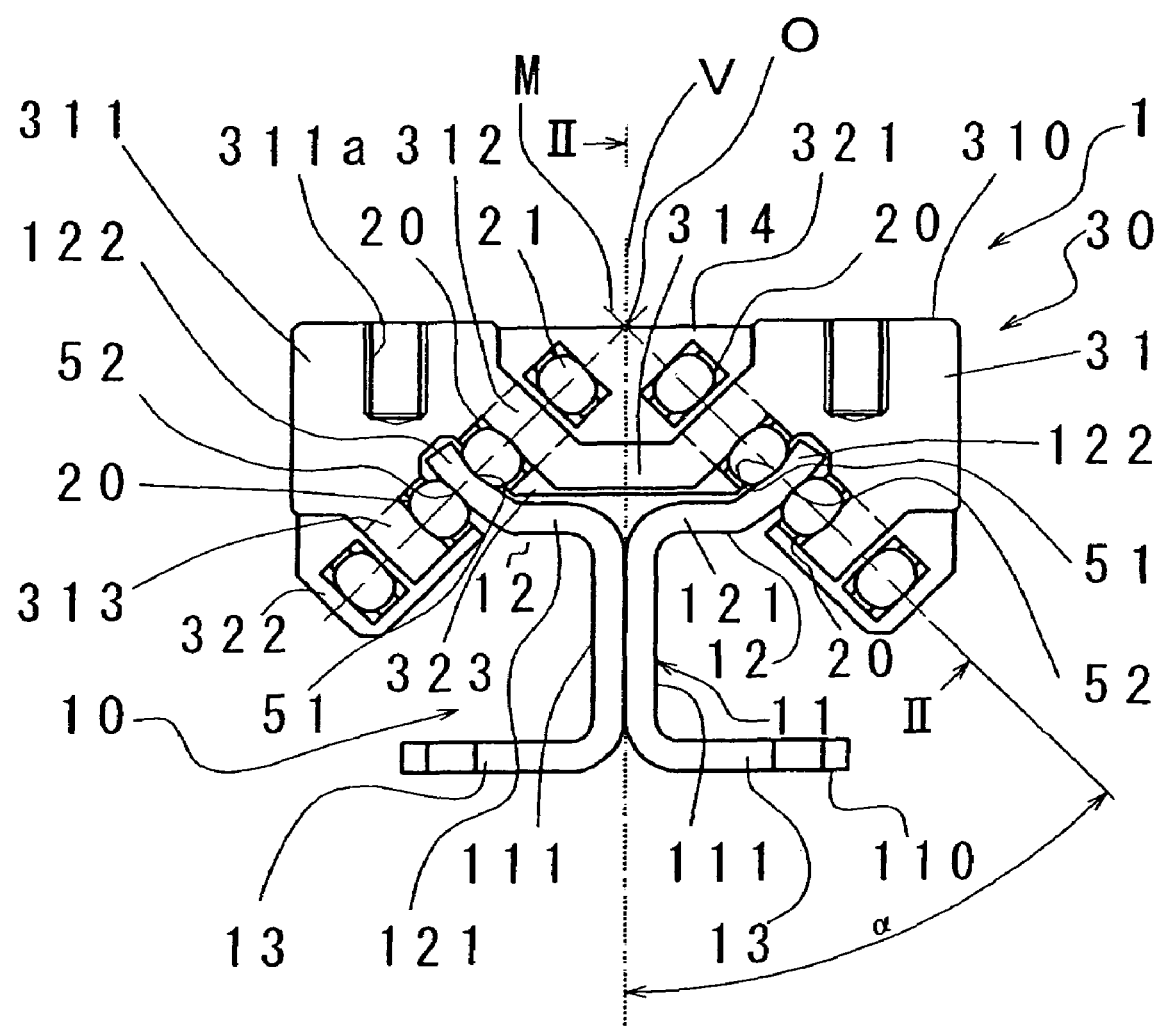
FIG. 1 is a vertical sectional front view of a rolling guide apparatus according to a first embodiment of the present invention.
Figure 2:
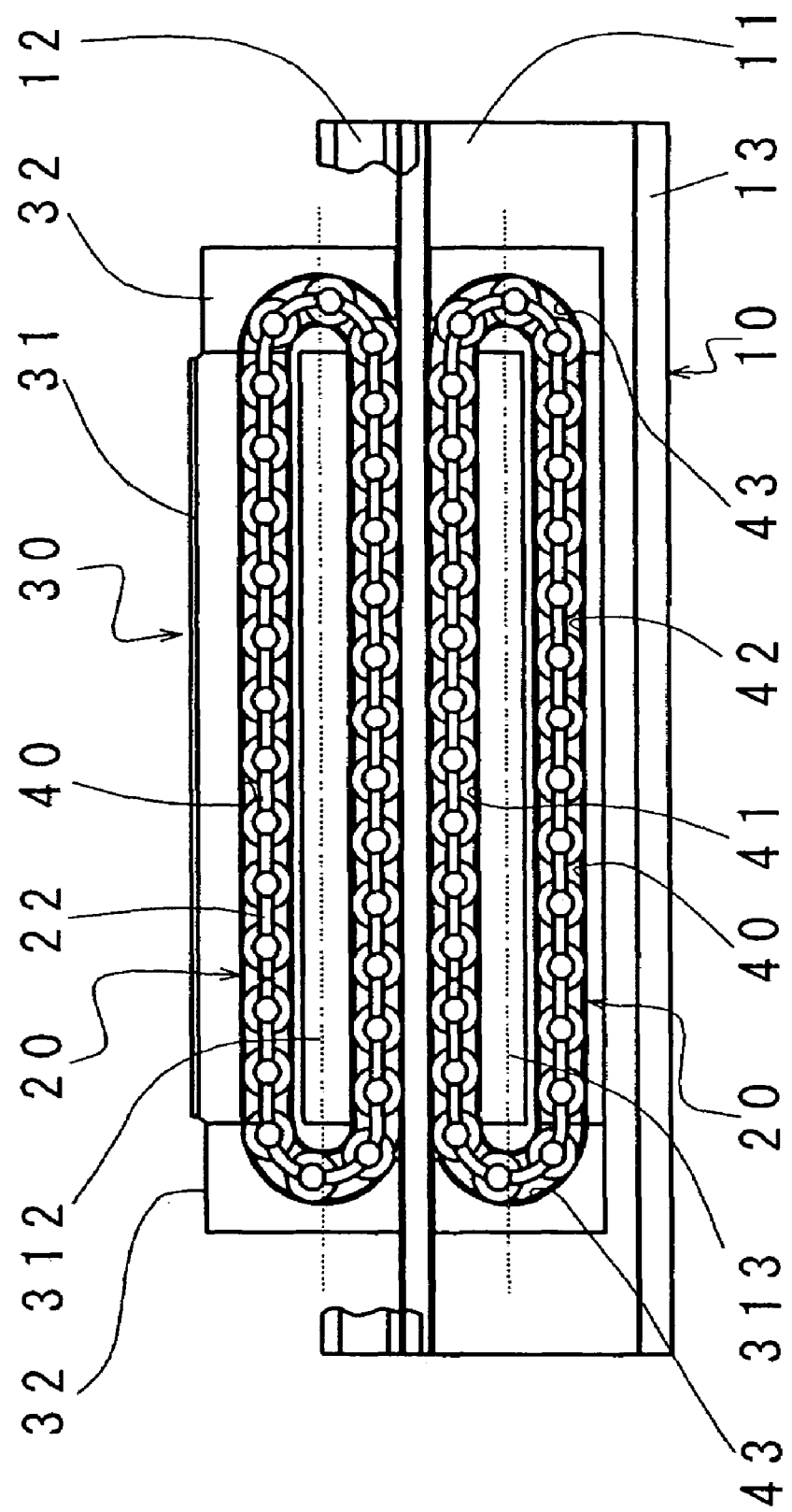
FIG. 2 is a side elevation view showing a movable block of the apparatus of FIG. 1 in cross section along line II-II.

Now, preferred embodiments of the present invention will be described below in detail while referring to the accompanying drawings.

Embodiment 1

FIG. 1, FIG. 2 and FIG. 9 through FIG. 14 show a rolling guide apparatus according to a first embodiment of the present invention.

This rolling guide apparatus 1 includes a track rail 10 having projected portions 12, 12 projecting laterally or to the left and right, and a movable block 30 having at least four sets of endlessly circulating roller rows 20 built therein which are in rolling contact with the upper and lower surfaces of the left and right projected portions 12, 12 of the track rail 10 (see FIG. 1 and FIGS. 9 through 12).

The track rail 10 has an I-shaped cross sectional configuration and is of an elastically deformable flexible structure which includes a thin central plate portion 11 extending vertically and being elastically deformable laterally or to the left or right, the above-mentioned thin projected portions 12, 12 projecting from an upper end portion of the central plate portion 11 laterally or to the left and right and being flexibly deformable in a vertical direction, and fixed plate portions 13, 13 projecting from a lower end of the central plate portion 11 laterally or to the left and right.

In this embodiment, the track rail 10 is comprised of a pair of rail members 110 each of a channel-shaped cross-sectional configuration with a lip. The rail members 110 are press-molded products, and each include a bottom plate portion 111 forming the central plate portion 11 of the track rail 10, one of the projected portions 12 being bent substantially at right angles from one side edge of the bottom plate portion 111, and one of the fixed plate portions 13 being bent at right angles from the other side edge of the bottom plate portion 111. The pair of rail members 110 are formed into an I-shaped configuration by welding the back sides of the bottom plate portions 111 thereof with each other.

Each projected portion 12 is provided with a horizontal portion 121 located at its root side adjacent the central plate portion 11, and an inclined circular arc portion 122 located at its projecting side. Each inclined circular arc portion 122 has a circular arc shape inclining upwardly with its lower surface being convexed downwardly. The left and right inclined circular arc portions 122, 122 are arranged symmetrically with respect to a central axis V so as to form a single circular arc shape with its center O being located on the central axis V. The above-mentioned four sets of endlessly circulating rolling member rows 20 are arranged such that they come in rolling contact with the upper and lower surfaces of the inclined circular arc portions 122. In this example, track grooves 51, 52, with which the rolling members come in contact, are formed by grinding the upper and lower surfaces of the inclined circular arc portions 122, 122.

The endlessly circulating rolling member rows 20 each comprise a multitude of rolling members in the form of ball rollers 21 that are one example of the rollers having circular-arc shaped rolling face portions, each row of ball rollers being held by an endless or non-endless flexible retainer member 22 and being built into a corresponding track-shaped endless circulation passage 40 formed in the movable block 30. Of course, it may be constructed such that the ball rollers in each row are not connected with one another through the retainer member 22. Each of the ball rollers 21 of the rolling members has a rolling spherical face portion 21a and spherical end portions 21b, and the rolling spherical face portion 21a has a diameter D which is set to be about 80% {} (15% to 17%) of a distance L between the spherical end portions 21b. The ball rollers, with their rolling spherical portions being in line contact with corresponding track grooves, have a load bearing capacity several times greater than that of balls, and hence they serve to increase the load bearing capacity and the rigidity of the rolling guide apparatus though no match for rollers. In addition, the ball rollers also have self-aligning capability, though not comparable to balls, and hence they are rolling members having an intermediate property between the balls and the rollers.

Each of the endless circulation passages 40 includes a rectilinear loaded-area passage 41 adapted to support the load between the track rail 10 and the movable block 30, an unloaded-area return passage 42 arranged in parallel to the loaded-area passage 41 at a predetermined distance therefrom, and direction changing passages 43 connecting adjacent end portions of the loaded-area passage 41 and the return passage 42 with each other.

The endless circulation passages 40 are arranged on inclined lines M, M that are bilaterally symmetrically inclined at a predetermined angle f ¿with respect to the vertical central axis V of the track rail 10, with the Loaded-area passages 41 and the return passages 42 being located on the corresponding inclined lines M. The center or intersection of the inclined lines M substantially coincides with the center of curvature O of the inclined circular arc portions 122, so that the rolling members in the loaded areas arranged so as to clamp the inclined circular arc portion of each projected portion are constructed to clamp the portions, at the same phase positions, of the upper and lower surfaces of the inclined circular arc portions 122 along the inclined lines M. The angle of inclination of each inclined line M is set substantially at an angle of 45 degrees in an illustrated example. Of course, the angle of inclination f ¿can be properly set according to the magnitude, direction, etc., of the load applied.

In the loaded-area passage 41 of each endless circulation passage 40, there is formed a track groove 52 opposing a track groove 51 formed in each inclined circular arc portion 122 of the track rail 10, with each endlessly circulating rolling member row 20 being rollably clamped between a corresponding pair of opposed track grooves 51, 52.

The movable block 30 is composed of a block main body 31, and a pair of end plates 32, 32 attached to the opposite ends of the block main body 31 to form the direction changing passages 43.

Only a portion of the block main body 31 required of strength and rigidity is formed of a metal structure portion 310, whereas the remaining portion thereof not required of strength and rigidity is formed of a resin structure portion 320, thereby achieving weight reduction.

The metal structure portion 310 includes a pair of lateral or left and right mounting structures 311 with bolt holes 311a formed in their upper surfaces, respectively, a pair of upper and lower race portions 312, 313 protruding from each of the mounting structures 311 toward the center thereof perpendicularly to a corresponding inclined line M so as to clamp the inclined circular arc portion 122 of a corresponding one of the projected portions 12, and a horizontal coupling portion 314 coupling between the left and right upper race portions 312.

The resin structure portion 320 includes a first resin portion 321 filled in and adhered to a concave portion defined between the upper race portions 312 and the coupling portion 314 of the metal structure portion 310, a pair of second left and right resin portions 322 adhered to the lower surfaces of the left and right lower race portions 313, and a third resin portion 323 adhered to a lower surface of the coupling portion 314.

The return passages 42 of the left and right endless circulation passages 40 located above the projected portions 12 of the track rail 10 are each formed into a tunnel-like configuration in the first resin portion 321, and the opposite ends of the second resin portions 322 constitute the side walls of the lower loaded-area passages 41. In addition, the return passages 42 of the lower endless circulation passage 40 are each formed into a tunnel-like configuration in the third resin portion 323, and turn around into the loaded-area passages 41 through the end faces of the lower race portions 313 to form the side walls of the loaded-area passages 41.

FIG. 3 through FIG. 8 show modifications of the flexible structure track rail and other constructional examples of combinations of rolling members according to the present invention.

First of all, reference will be made to the track rail.

Figure 3:
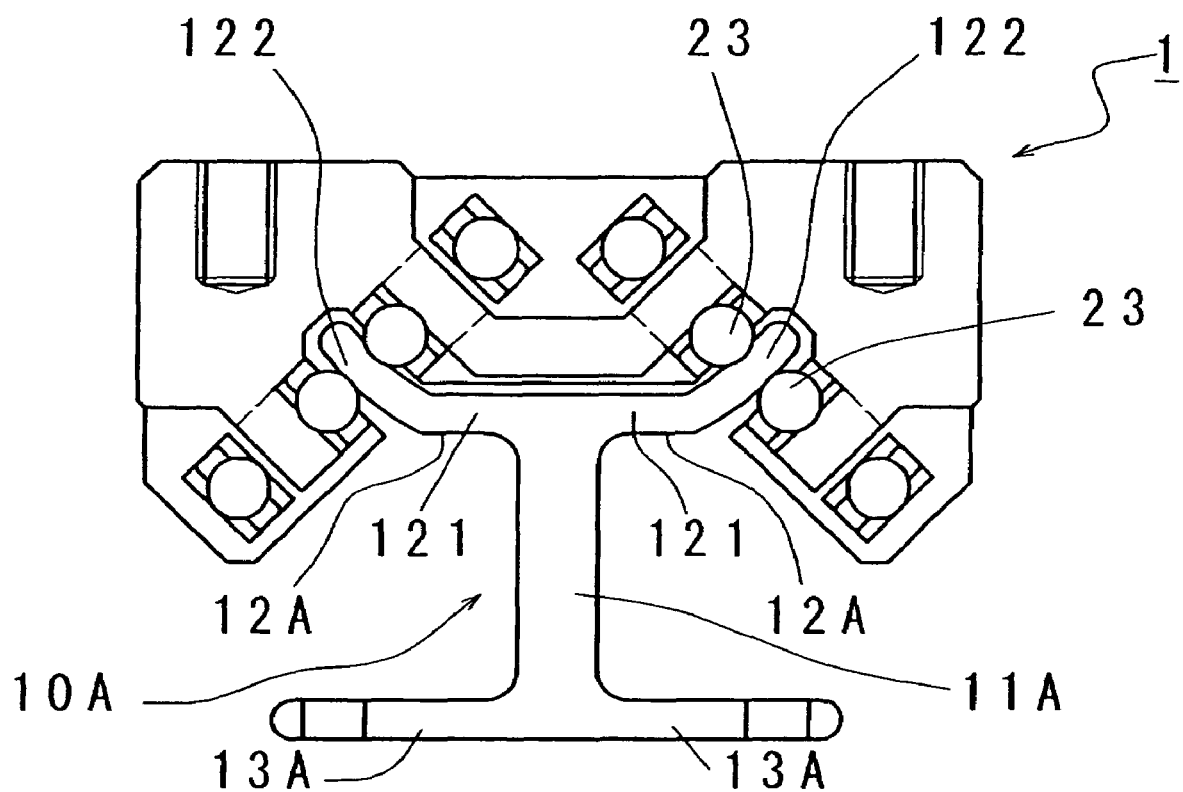
FIG. 3 is a vertical sectional front view showing a modification of a track rail and rolling members of the apparatus of FIG. 1.

FIG. 3 shows a first example of a modification of the track rail.

In this example, a truck rail 10A has an elastically deformable flexible structure formed by drawing, and includes a thin central plate portion 11A extending in a vertical direction and being elastically deformable laterally or to the left or right, thin projected portions 12A, 12A, as described above, projecting from an upper end portion of the central plate portion 11A laterally or to the left and right and being flexibly deformable in the vertical direction, and fixed plate portions 13A, 13A projecting from a lower end of the central plate portion 11A laterally or to the left and right. The central plate portion 11A, the projected portions 12A, 12A and the fixed plate portions 13A, 13A are integrally molded with each other.

Figure 4:
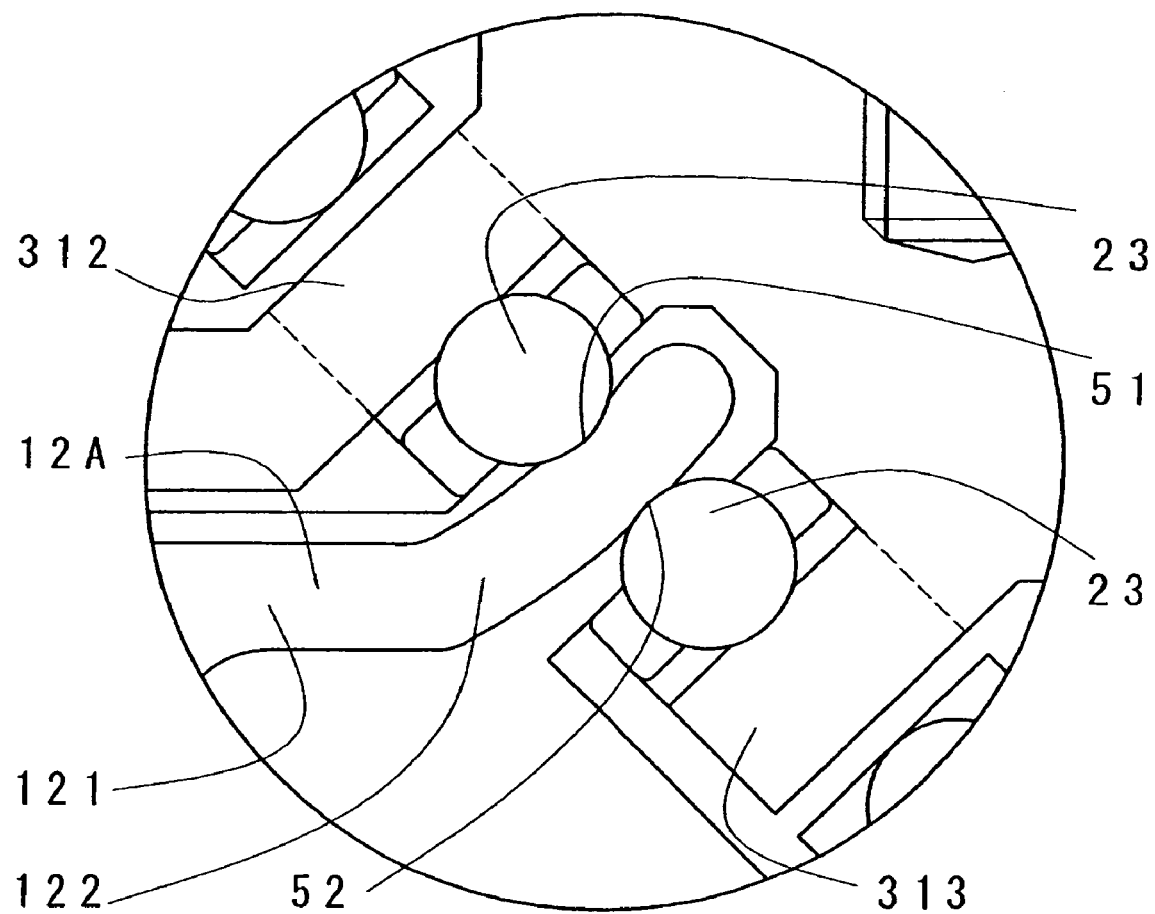
FIG. 4 is an enlarged cross sectional view of contact portions of the rolling members of the apparatus of FIG. 3.

Since enough accuracy can not be obtained for the track rail of such a drawn member, track grooves 51, 52 for rolling members are formed by grinding each projected portion 12A, as shown in FIG. 4.

Figure 5:
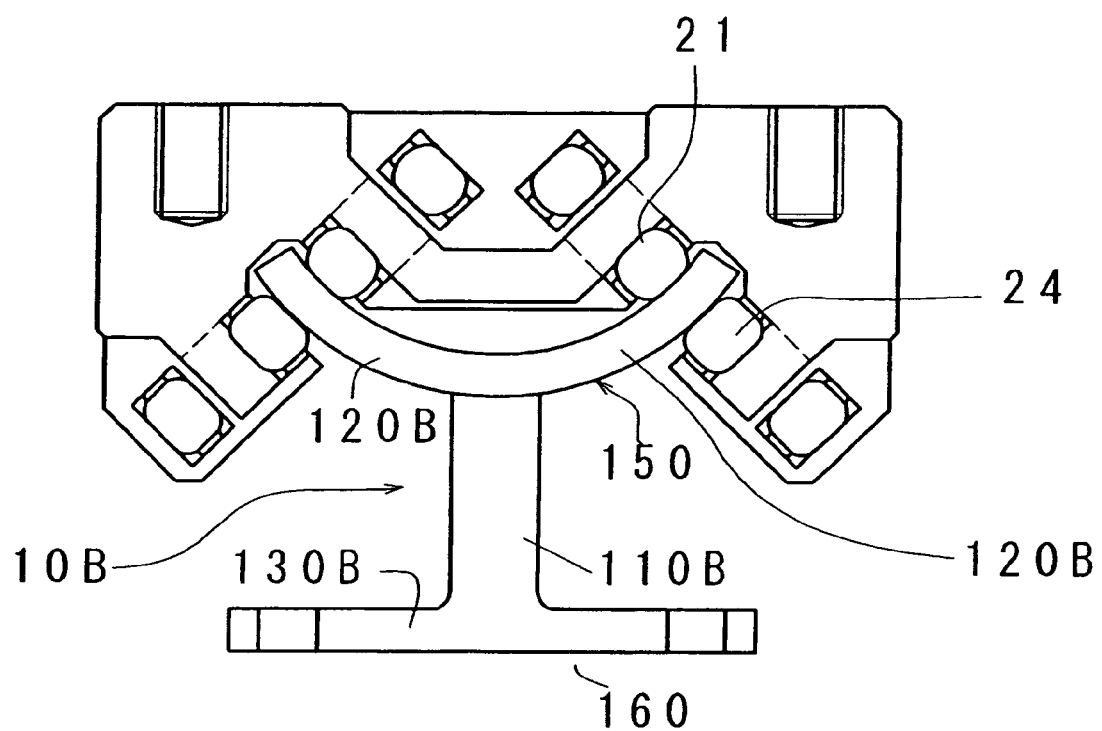
FIG. 5 is a vertical sectional front view showing another modification of the track rail and the rolling members of the apparatus of FIG. 1.
Figure 7:
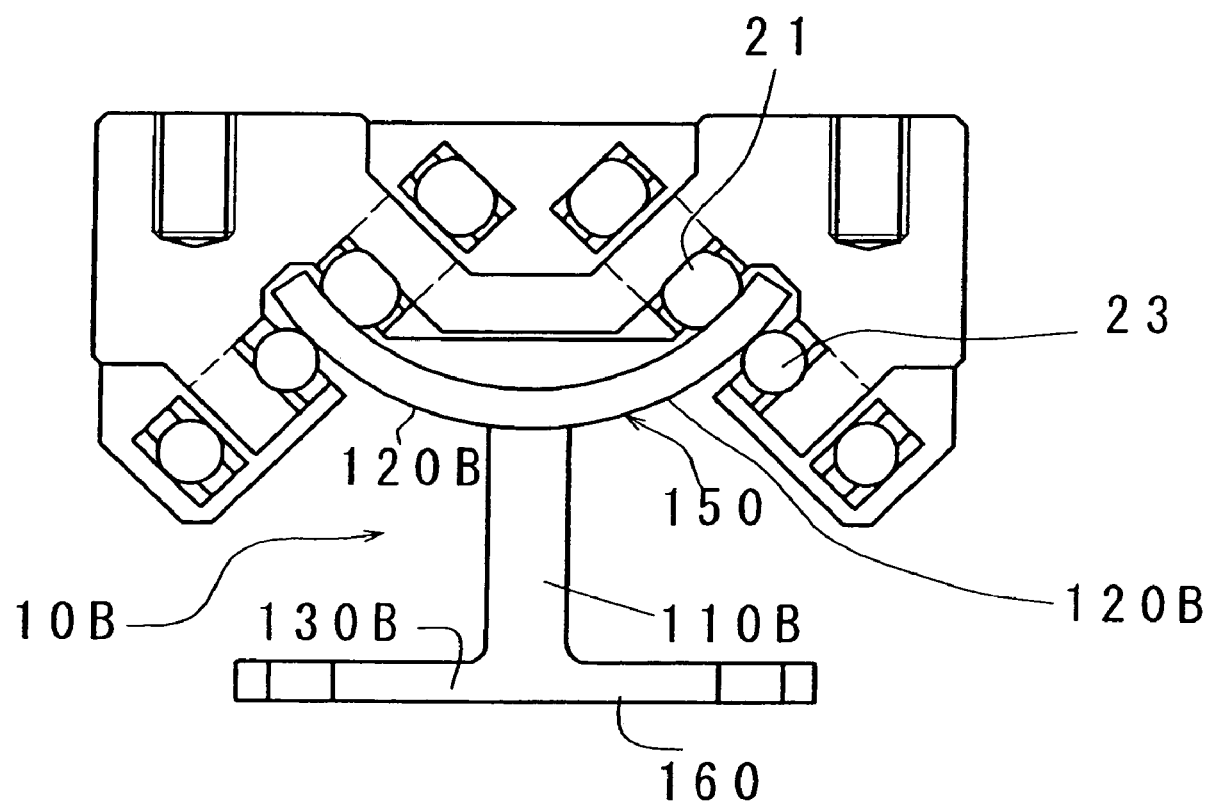
FIG. 7 is a vertical sectional front view showing a further modification of the track rail and the rolling members of the apparatus of FIG. 1.

FIG. 5 and FIG. 7 show second examples of a modification of the track rail.

This example shows a track rail 10B of a flexible structure which is produced by combining a cover plate 150 molded from precision sheet steel into a circular arc shape, with a base member 160 molded by drawing.

The cover plate 150 forms lateral or left and right thin projected portions 120B which are flexibly deformable in the vertical direction. The base member 160 includes a thin central plate portion 110B supporting a central portion of a lower surface of the cover plate 150 and being flexibly deformable laterally or to the left or right, and a fixed plate portion 130B supporting the central plate portion 110B. The cover plate 150 and the central plate portions 110B of the base member 160 are fixedly attached to each other by electrodeposition welding.

Next, reference will be made to an example of a combination of rolling members.

Although the example using ball rollers as rolling members has been shown in FIG. 1, it is possible to use appropriate combinations of balls and rollers.

Figure 14:
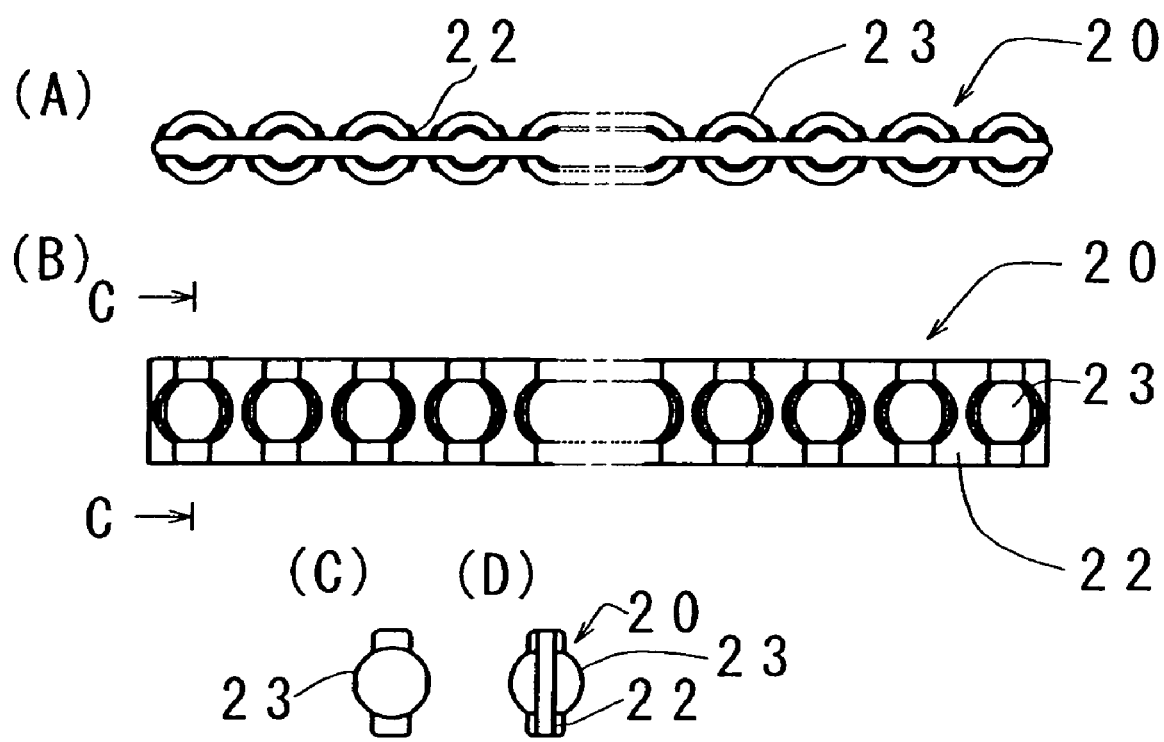
FIG. 14 shows a retainer for the balls shown in FIG. 3, wherein (A) is a front elevation view thereof; (B) is a plan view thereof; (C) is a cross sectional view along line C-C of (B); and (D) is a side elevation view of (B).

For instance, in an example as shown in FIG. 3 and FIG. 4, the balls 23 are used for all the rolling members of the upper and lower endlessly circulating rolling member rows 20, and the track grooves 51, 52 are formed by grinding the upper and lower surfaces of the inclined circular arc portions 122 of the projected portions 12A, respectively. The balls 23 are held by a flexible retainer member 22, as shown in FIG. 14.

In cases where the rolling guide apparatus of the present invention is used for an aseismatic or quake-free mechanism in ordinary houses, the use of the balls 23 is satisfactory.

Figure 6:
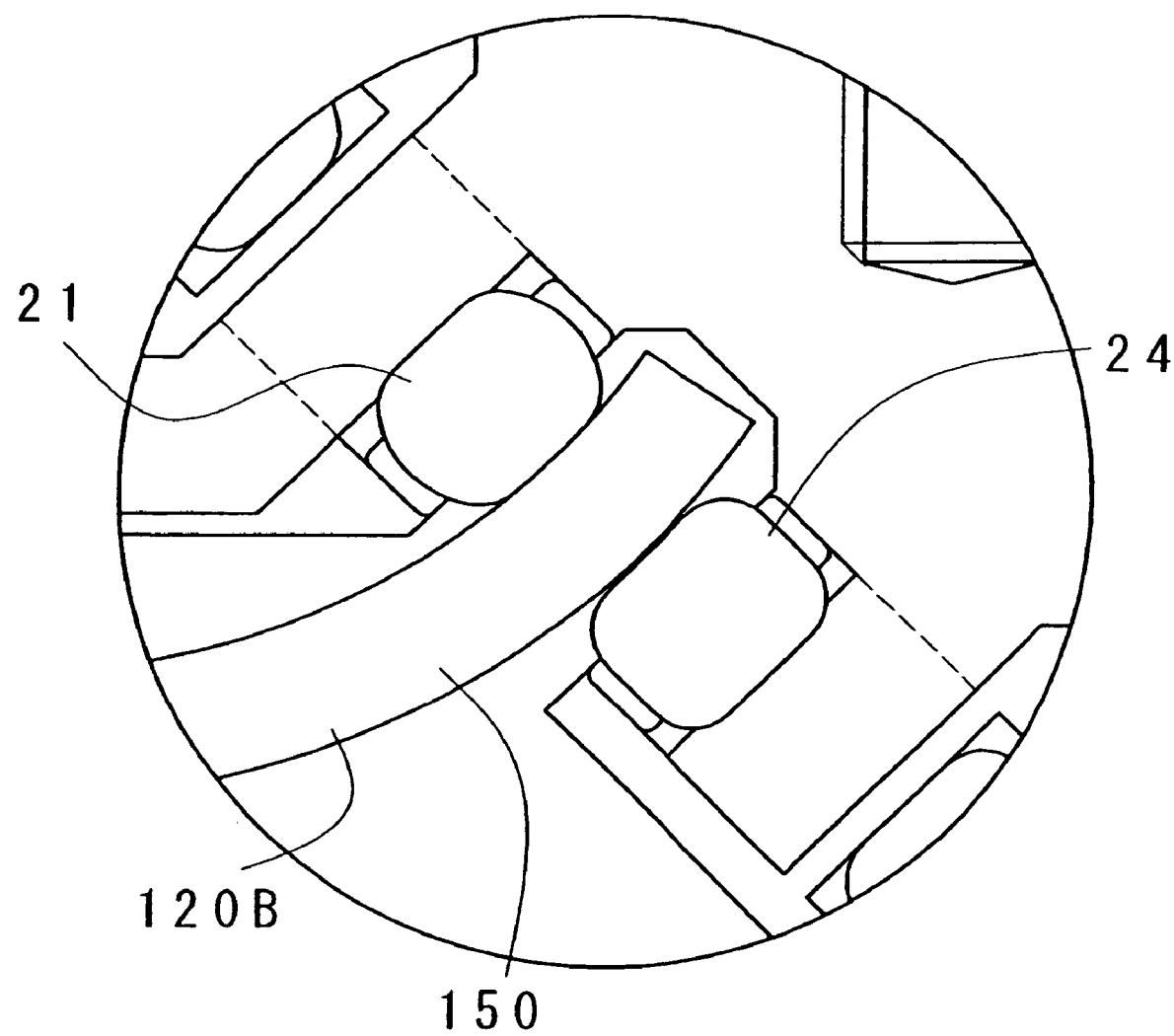
FIG. 6 is an enlarged cross sectional view of contact portions of the rolling members of the apparatus of FIG. 5.

In an example as shown in FIGS. 5 and 6, ball rollers 21 for receiving a heavy load are used for the rolling members of the upper endlessly circulating rolling member rows, whereas cylindrical rollers 24 are used for the rolling members of the lower endlessly circulating rolling member rows. In this example, the radius of curvature of the circular-arc shaped cover plate 150 is made in coincidence with the radius of curvature of a rolling spherical face portion 21a of each ball roller 21. Since precision sheet steel has high precision, there is no need for track grooves. Therefore, the contact portions of the ball rollers 21 with the upper and lower surfaces of the cover plate 150 can slip sideways along the circular arc surfaces, so the apparatus can be automatically self-aligned by the slippage of the contact portions, too.

Figure 8:
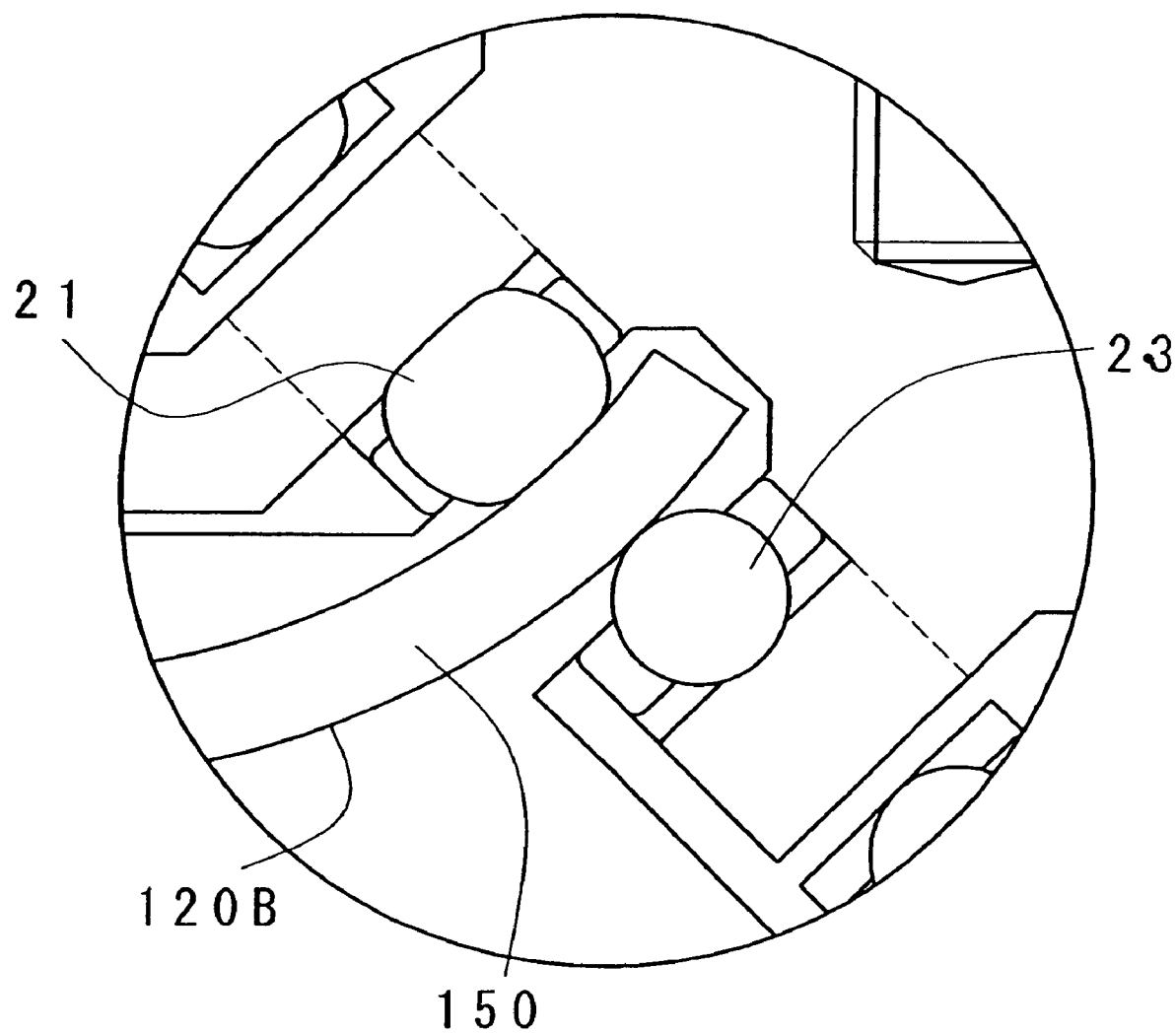
FIG. 8 is an enlarged cross sectional view of contact portions of the rolling members of the apparatus of FIG. 7.
Figure 9:
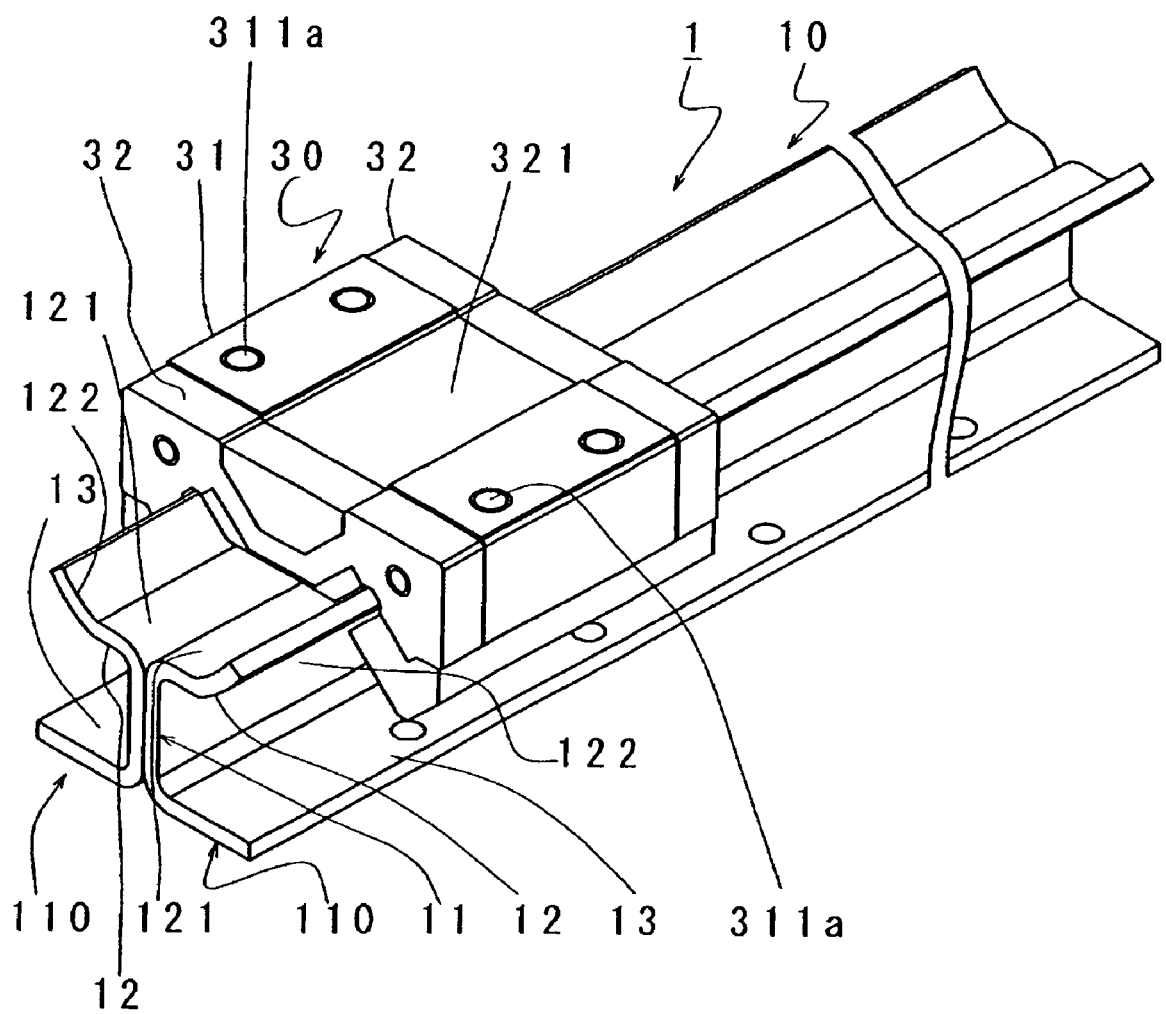
FIG. 9 is a perspective view of the apparatus of FIG. 1.
Figure 10:
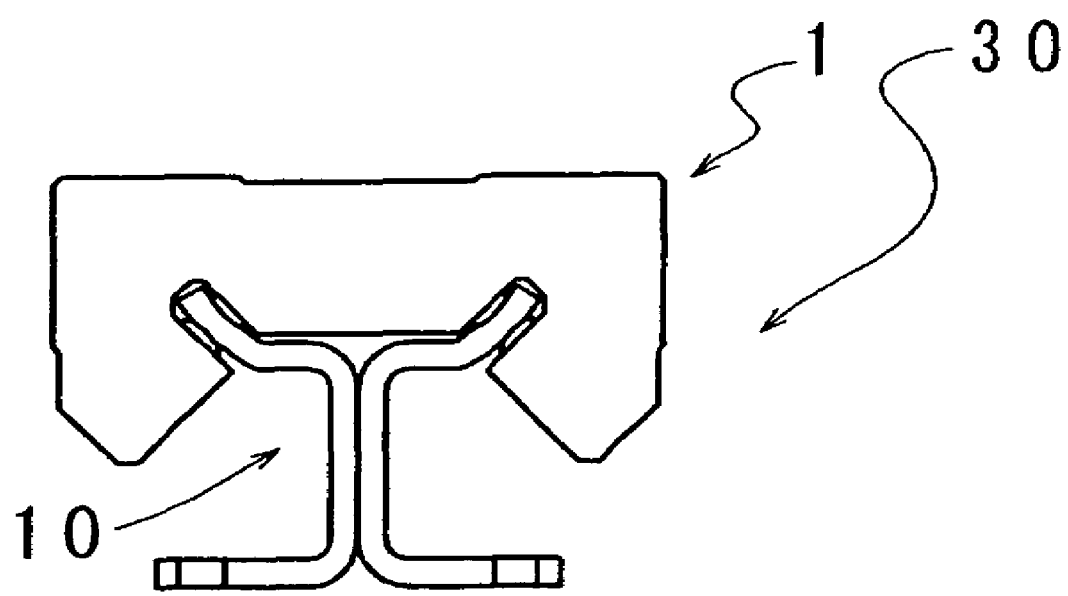
FIG. 10 is a front elevation view of the apparatus of FIG. 1.
Figure 11:
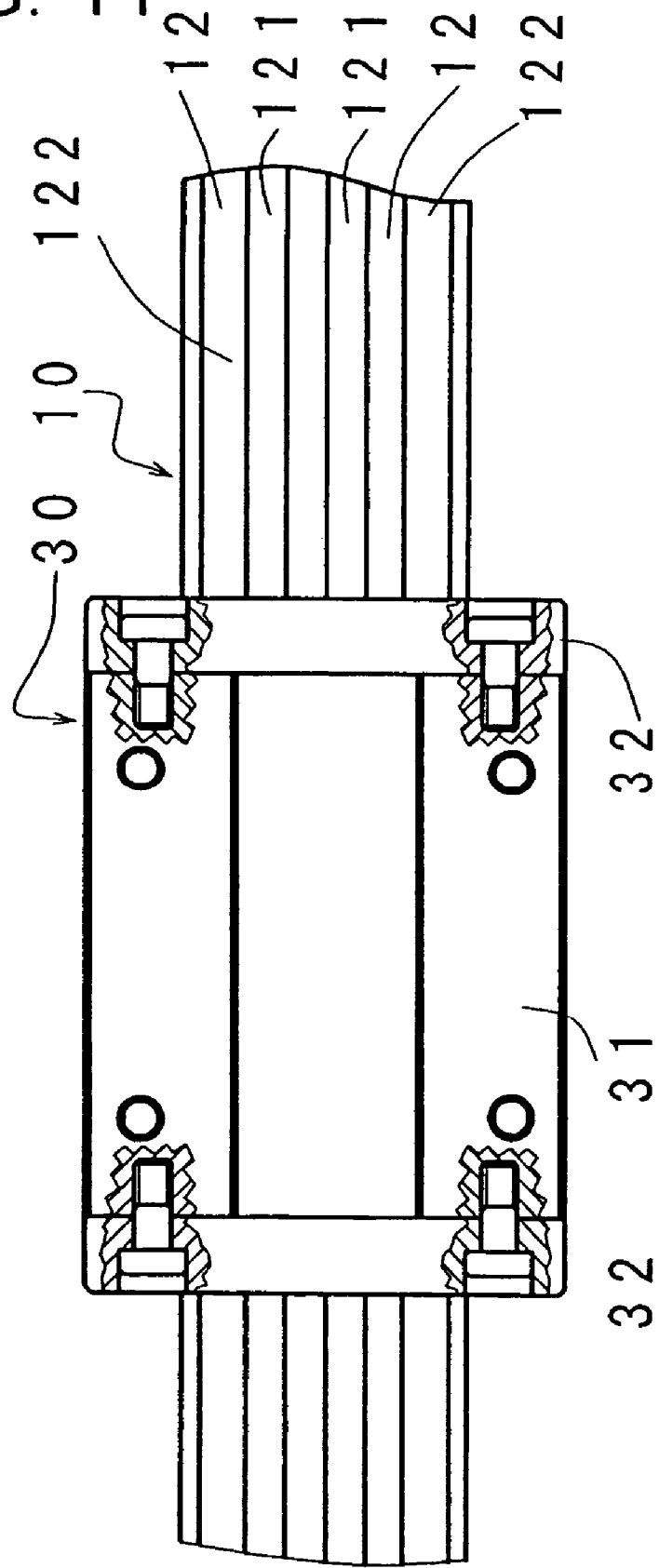
FIG. 11 is a plan view of the apparatus of FIG. 1.
Figure 12:
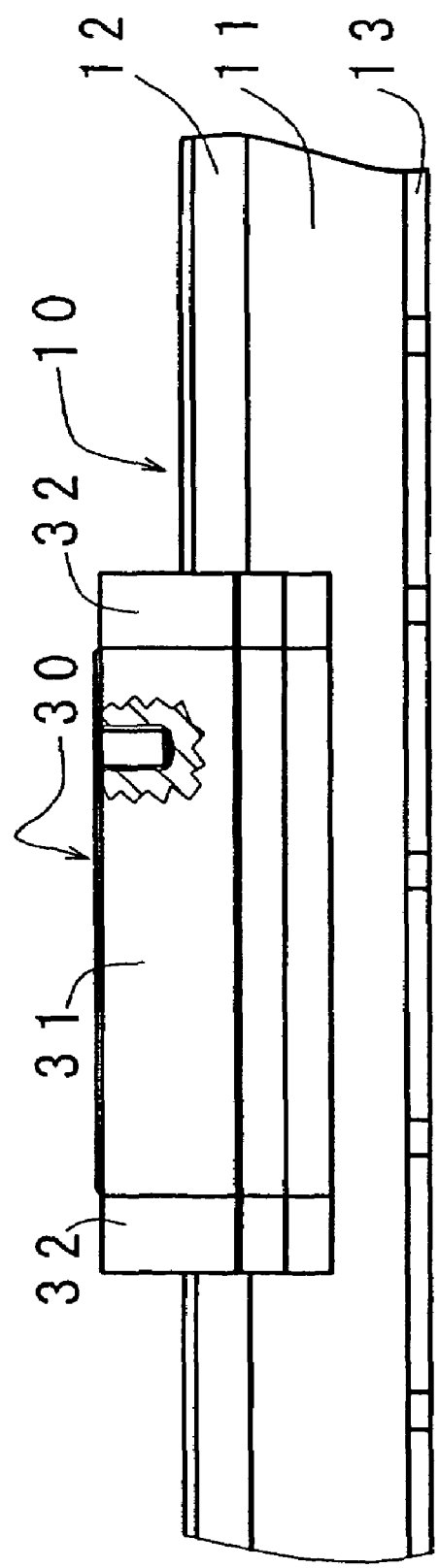
FIG. 12 is a side elevation view of the apparatus of FIG. 1.
Figure 13:
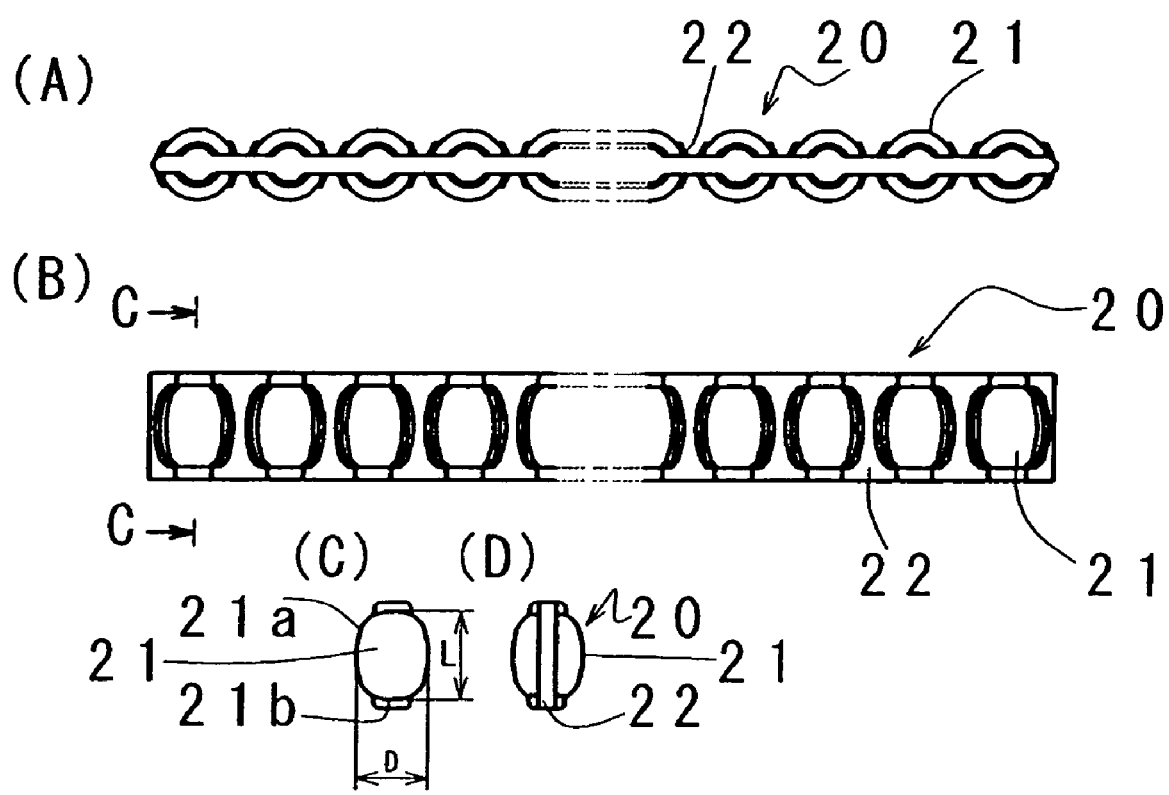
FIG. 13 shows a retainer for the ball rollers of the apparatus of FIG. 1, wherein (A) is a front elevation view thereof; (B) is a plan view thereof; and (C) is a cross sectional view along line C-C of (B); and (D) is a side elevation view of (B).

In cases where the load acting in a floating direction is small, balls 23 can be used for lower endlessly circulating rolling member rows, as shown in FIG. 7 and FIG. 8. Such a combination of rolling members and a track rail can be properly selected according to the application of use. For instance, a combination of a track rail as shown in FIG. 1 and balls for all four rows may be used. Alternatively, when the applied load is large, it is preferable that ball rollers be used for the upper two rows alone, and balls for the lower two rows. In that case, it is further preferable to use a track rail made of a drawn member of relatively high rigidity but with some flexibility, as shown in FIG. 3. In either case, a wide range of uses can be accommodated at low costs without impairing the light and smooth rolling guidance.

Figure 24:
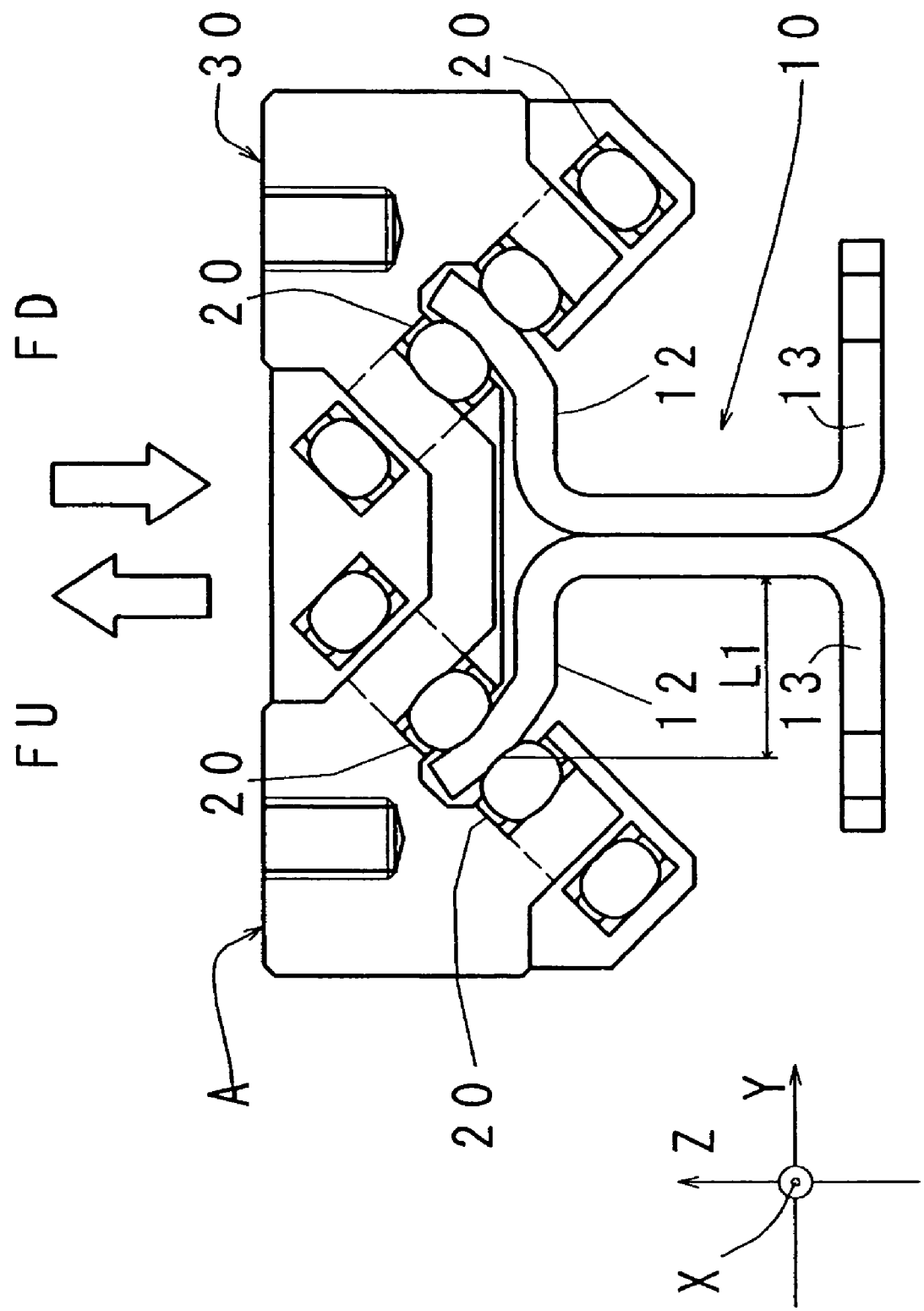
FIG. 24 is an explanatory view showing the operation of the rolling guide apparatus according to the first embodiment of the present invention.
Figure 25:
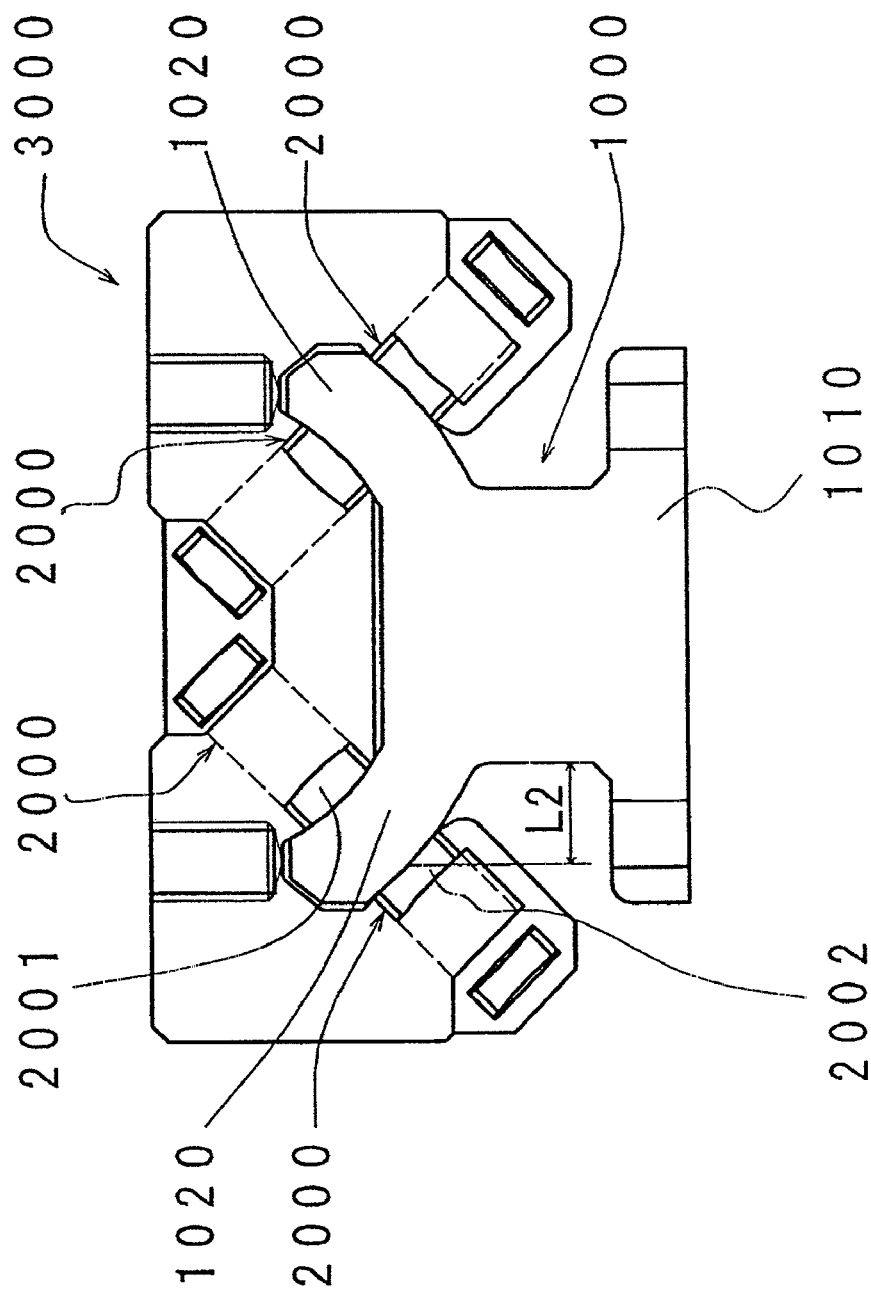
FIG. 25 is a vertical cross sectional view of a rolling guide apparatus using a conventional rigid track rail.

FIG. 24 and FIG. 25 show, by comparison, a rolling guide apparatus having a track rail 10 of a flexible structure according to the present invention, and a rolling guide apparatus with a conventional track rail 1000 of a rigid structure.

The flexible structure track rail 10 of the present invention (FIG. 24) is reduced in thickness and weight as compared with the conventional rigid structure track rail 1000 (FIG. 25), but still has a high shock reducing or absorbing effect due to its flexible structure as well as a self-aligning capability to absorb a more or less parallelism error between mounting surfaces.

Though a variety of fields of application of the present invention can be considered, most suitable are applications to an aseismatic guiding mechanism in relatively light-weight buildings such as ordinary houses, and to a guiding mechanism for structural objects such as cars, aircrafts or the like that are able to move at high speed and are apt to undergo substantial deformation upon receipt of an impact load.

Explaining the characteristic of the flexible structure track rails of the present invention in more detail, with respect to an impact load FD acting downwardly from above or a floating load FU acting upwardly from below, the projected portions 12 are flexed downwardly to absorb such a load. In the case of the present invention, a shock or impact absorbing effect is greater than that of the conventional rigid structure track rail for the following reasons: that is, the length L1 of each projected portion of the present invention is greater than the length L2 of each projected portion of the conventional rigid structure track rail, and the projected portions of the present invention are reduced in thickness. Moreover, an error of parallelism between the mounting surface of the track rail 10 and the mounting surface of the movable block is absorbed by the deflection of the projected portions 12 of the track rail 10 and the central plate portion 11.

For example, assuming that the longitudinal direction of the track rail 10 is an X axis; the horizontal direction orthogonal to the X axis is a Y axis; the vertical direction is a Z axis; and the mounting surface of the track rail 10 is a reference plane A, an error in the Y-axis direction is absorbed by a lateral or left and right deflection of the central plate portion 11, and an error in the Z-axis direction is absorbed by vertical deflections of the left and right projected portions 12, 12.

Moreover, when the track rail 10 is inclined in a direction to rotate about the X axis with respect to the mounting surface A of the movable block 30 (lateral or left or right inclination), one of the projected portions 12 deflects upwardly, the other projected portion 12 deflects downwardly, and in addition the central plate portion 11 also deflects laterally or to the left or right, whereby the inclination is absorbed. Furthermore, when the movable block 30 is inclined in a direction to rotate about the Y axis (fore-and-aft inclination), the forward end side and the rear end side of the projected portion 12 respectively deflect in vertically opposite directions to absorbe the inclination. In addition, when the movable block 30 is inclined in a direction to rotate about the Z axis (twist in the horizontal direction), the central plate portion 11 and the left and right projected portions 12 deflect in accordance with the inclination, whereby the inclination is absorbed.

In this manner, the error of parallelism between the mounting surfaces and the mounting error thereof are absorbed by the elastic deformation of the flexible structure track rail, so that the contact structure of the endlessly circulating rolling member rows with the track grooves is maintained properly, ensuring light and smooth movement therebetween.

Figure 15:
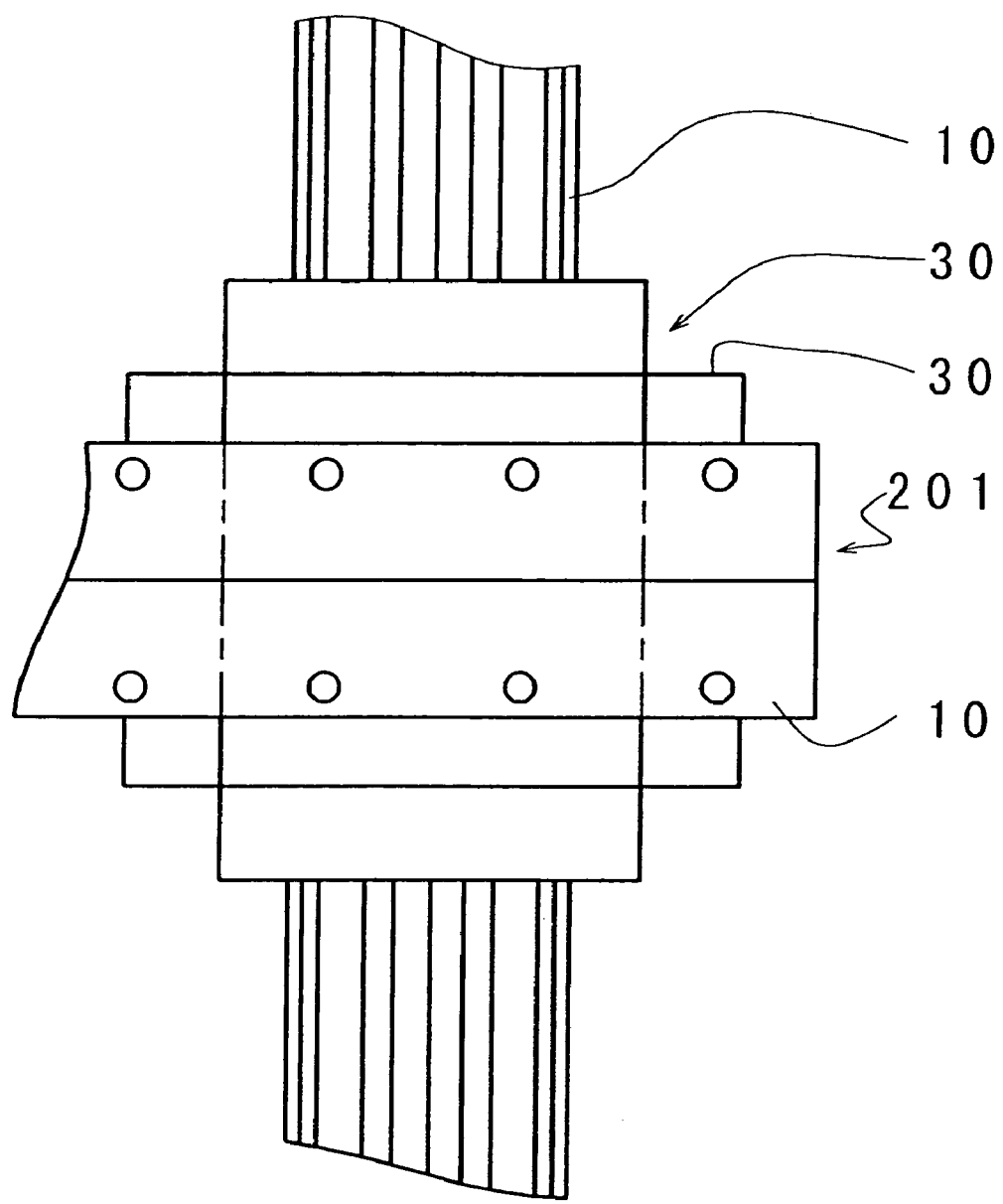
FIG. 15 is a plan view of a rolling guide apparatus according to a second embodiment of the present invention.
Figure 16:
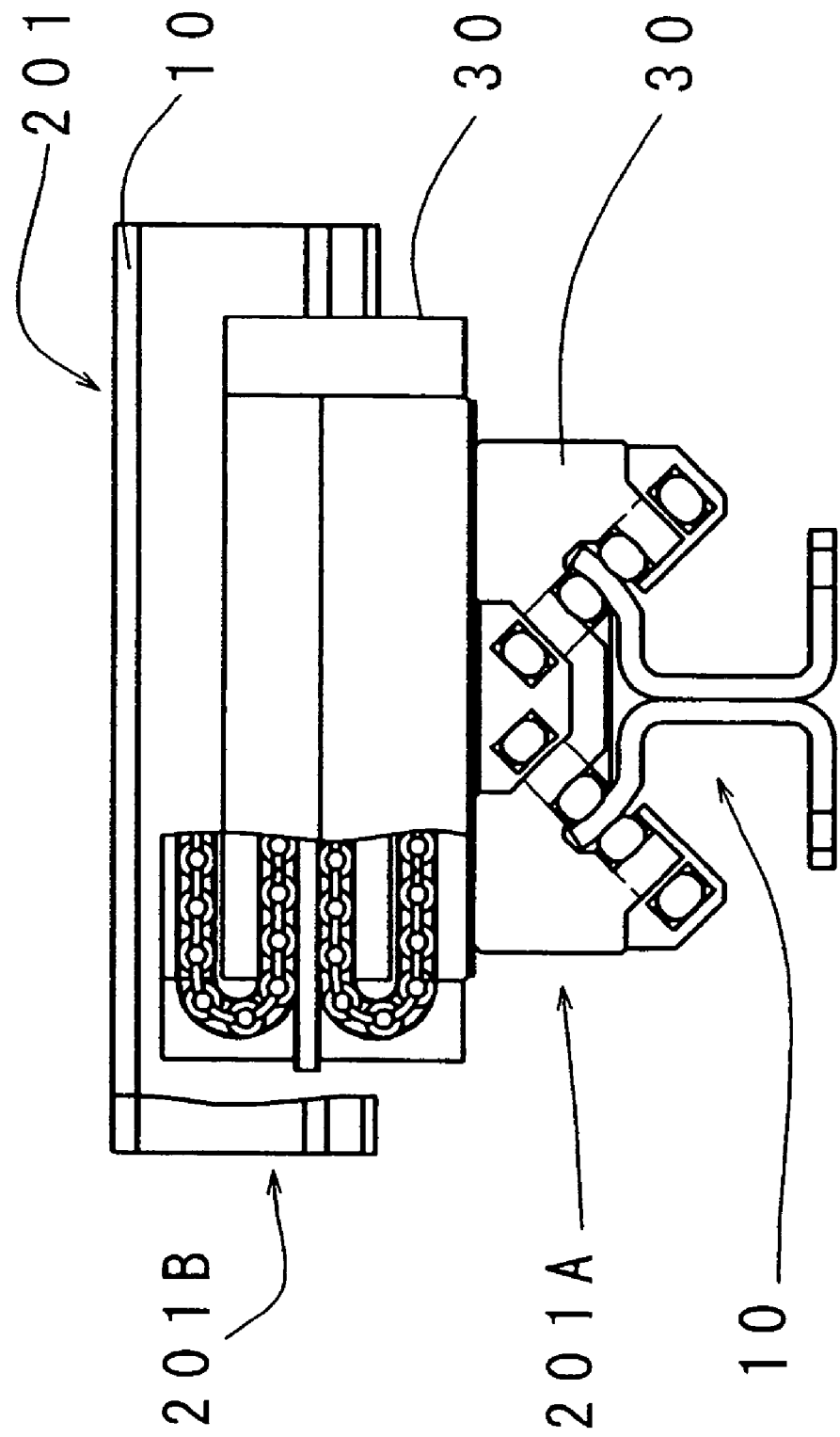
FIG. 16 is a partially broken front elevation view of the apparatus of FIG. 15.

FIG. 15 and FIG. 16 show a second embodiment of the present invention.

This second embodiment comprises a biaxial rolling guide apparatus which can be moved in two axial directions mutually orthogonal to each other by combining two rolling motion guide apparatuses.

That is, the above-mentioned rolling guide apparatuses 1 are arranged in a vertically opposite relation with respect to each other with the respective track rails 10, 10 being disposed orthogonal to each other, and the two movable blocks 30, 30 are coupled with each other in back-to-back contact to form an integral structure. It is to be noted that the term "integral structure" referred to herein includes the case in which the two separate movable blocks 30, 30 are integrally coupled with each other by means of bolts or the like, and the case in which they are integrally molded with each other from one seamless material. In the case of the two movable blocks 30, 30 being coupled with each other, some error can be absorbed by the flexibility of the track rails 10 themselves, and hence high precision as required for conventional track rails of high rigidity is not needed, thus facilitating their assembly. As a result, it is also possible to easily couple them with each other by electrodeposition welding or the like.

That is, this biaxial rolling guide apparatus 201 comprises a lower first motion guide portion 201A, and an upper second motion guide portion 201B that performs a guiding operation in a direction orthogonal to the operation of the lower first motion guide portion 201A. The construction of the lower first motion guide portion 201A is quite the same as the construction of the above-mentioned first embodiment, and the upper second motion guide portion 201B is different from the lower first motion guide portion 201A only in the upside-down or vertically opposite arrangement and in that the directions of the. pair of track rails 10, 10 are arranged orthogonal to each other. Consequently, the basic structures thereof are quite the same with each other, and hence an explanation thereof is omitted.

Figure 17:
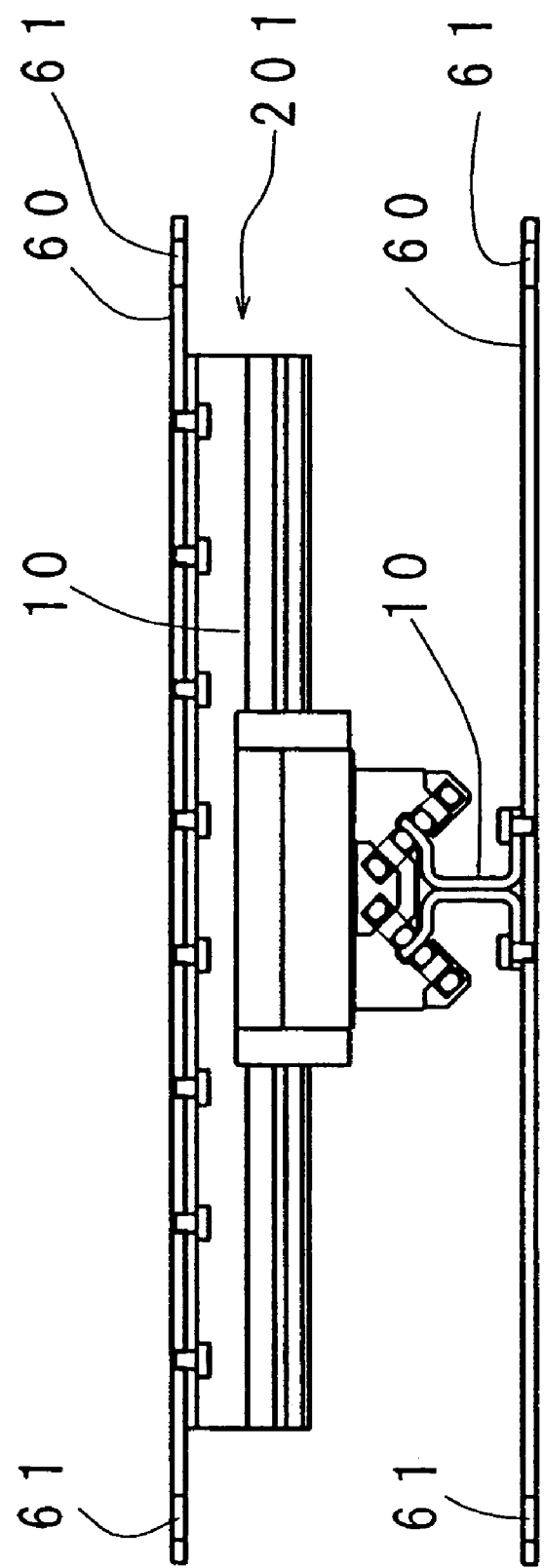
FIG. 17 is a front elevation view with mounting plates being assembled to the apparatus of FIG. 15.
Figure 18:
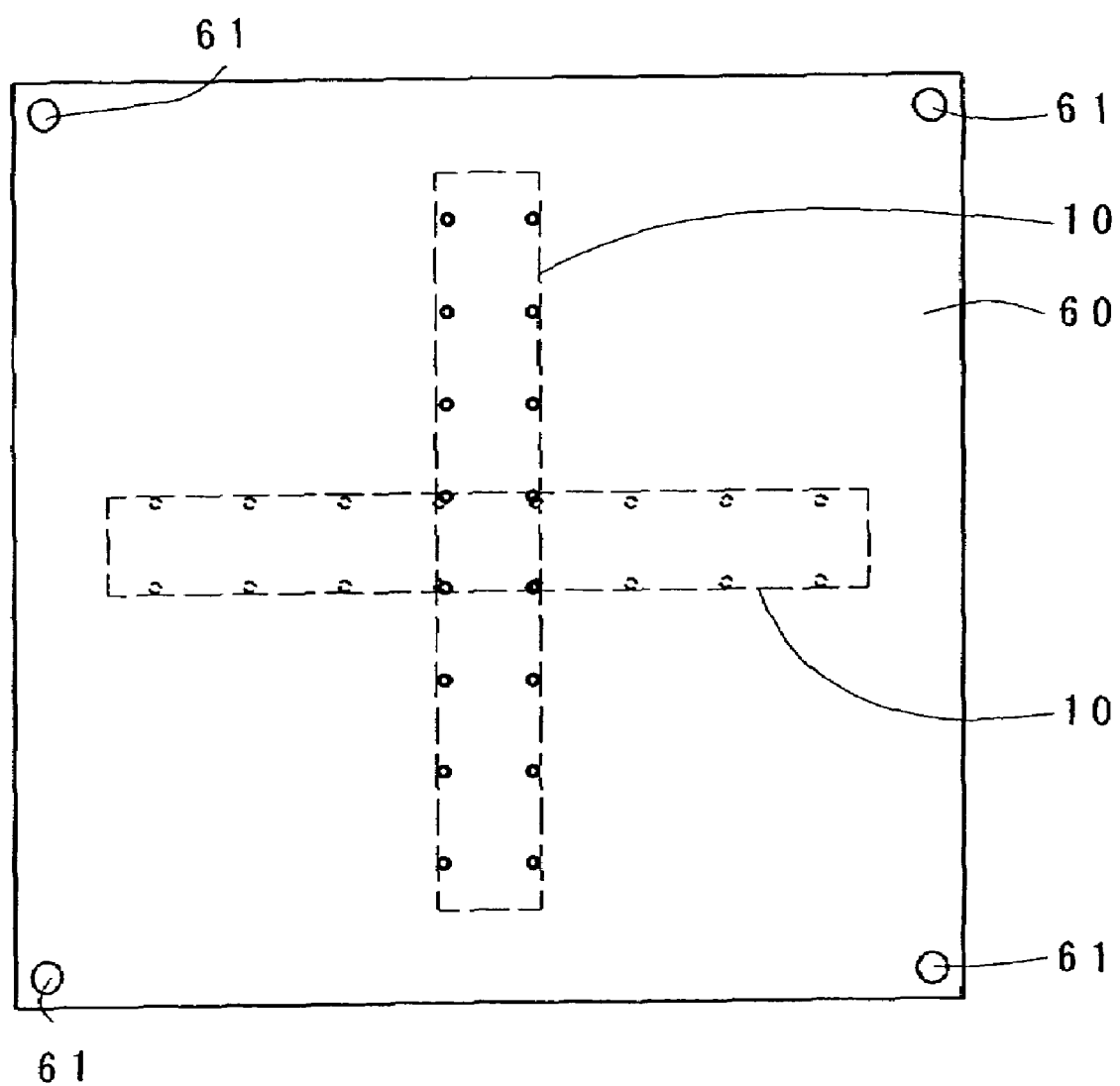
FIG. 18 is a plan view of FIG. 17.

In this embodiment, the upper and lower track rails 10, 10 are mounted to the centers, respectively, of a pair of rectangular mounting plates 60, 60 having spring property such as steel plates to form a unit, as shown in FIG. 17 and FIG. 18.

This unit is particularly suitable for quake or seismic isolation. Specifically, the lower mounting plate is fixedly secured to a base or foundation, and the upper mounting plate is fixedly attached to a structural member such as a pillar in a building.

Each of the mounting plates 60 has mounting bolt holes 61 at four corners thereof, and a central portion of each mounting plate, to which the track rails 10, 10 are attached, can be deformed elastically in the vertical direction with their mounting portions at the four corners being made as a fulcrum. Thus, when subjected to an impact, the mounting plates themselves also deform elastically to provide a great impact absorbing effect in cooperation with the elastic deformation of the projected portions of the track rails.

Moreover, formation of the unit in this manner also has an advantage that handling becomes easy.

Figure 19:
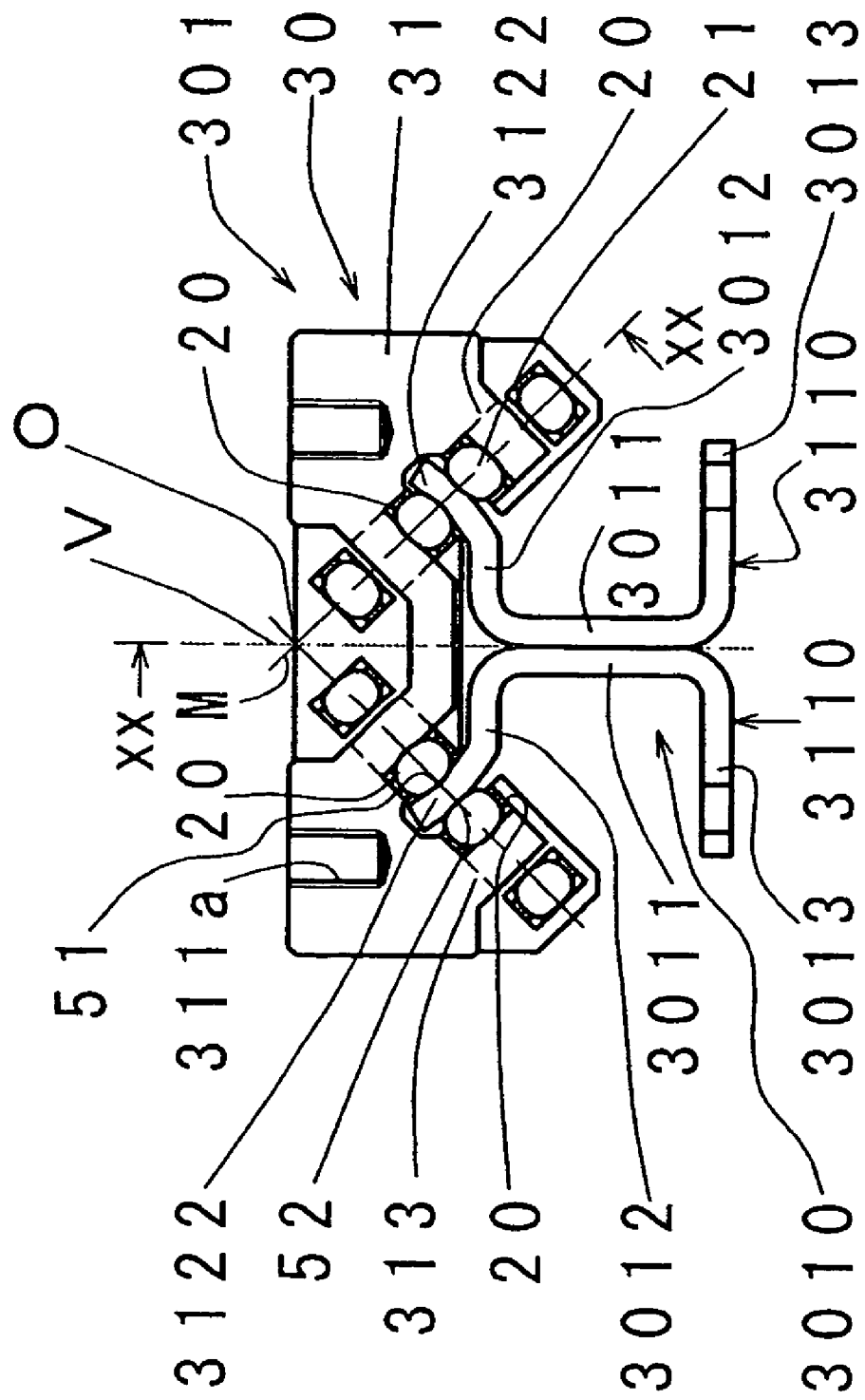
FIG. 19(A) is a vertical sectional front view of a rolling guide apparatus according to a third embodiment of the present invention.
Figure 20:
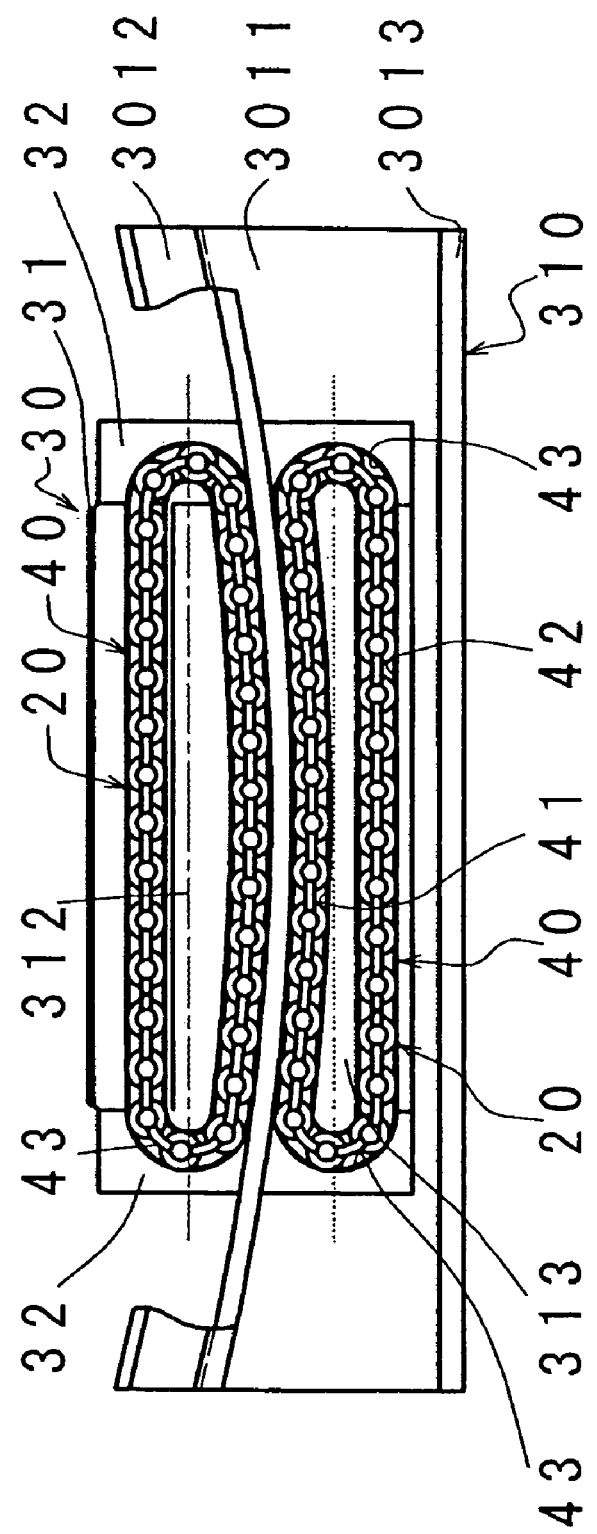
FIG. 20 is a side elevation view showing a movable block of the apparatus of FIG. 19 in cross section along line XX-XX.

FIG. 19 and FIG. 20 show a rolling guide apparatus according to a third embodiment of the present invention.

This rolling guide apparatus 301 differs from the first embodiment in that a track rail 3010 comprises a curved rail curving in the vertical direction along the longitudinal direction thereof, with the other construction being basically the same as that of the first embodiment. In the following description, differences alone will be explained with the same components being identified by the same symbols while omitting an explanation thereof.

Specifically, a track rail 10 has an I-shaped cross sectional configuration and is of an elastically deformable flexible structure which includes a thin central plate portion 3011 extending vertically and being elastically deformable laterally or to the left or right, thin projected portions 3012, 3012 projecting from an upper end portion of the central plate portion 3011 laterally or to the left and right and being flexibly deformable in the vertical direction, and, and fixed plate portions 3013, 3013 projecting from a lower end of the central plate portion 3011 laterally or to the left and right.

The upper end portion of the central plate portion 3011 is of a configuration curving upwardly along the longitudinal direction thereof, and the projected portions 3012, 3012 projecting from the upper end portion of the central plate portion 3011 also take a shape curving along the longitudinal direction thereof. The lower end portion of the central plate portion 3011 is configured to extend in a line along the longitudinal direction of the track rail, so that the fixed plate portions 3013, 3013 project rectilinearly therefrom.

Track grooves 51, 52, which are formed on the upper and lower surfaces of an inclined circular arc portion 3122 of each of the projected portions 3012 of the track rail 3010, curve in the vertical direction, too. Upper and lower race portions 312, 313 of a movable block 330 in opposition to the track grooves 51, 52, respectively, also curve similarly.

In this embodiment, the track rail 3010 is comprised of a pair of rail members 3110 each of a channel-shaped cross-sectional configuration. The rail members 3110 each include a bottom plate portion 3111 of a press-molded product forming the central plate portion 311 of the track rail 310, one of the projected portions 3012 being bent substantially at right angles from one side edge of the bottom plate portion 3111, and one of the fixed plate portions 3013 being bent at right angles from the other side edge of the bottom plate portion 3111. The pair of rail members 3110 are formed into an I-shaped configuration by welding the back sides of the bottom plate portions 3111 thereof with each other.

The curved rail may be formed by integral molding, as shown in FIG. 3, or it can be composed of a cover plate and a base portion which are made of precision sheet steel, as shown in FIG. 5.

Figure 21:
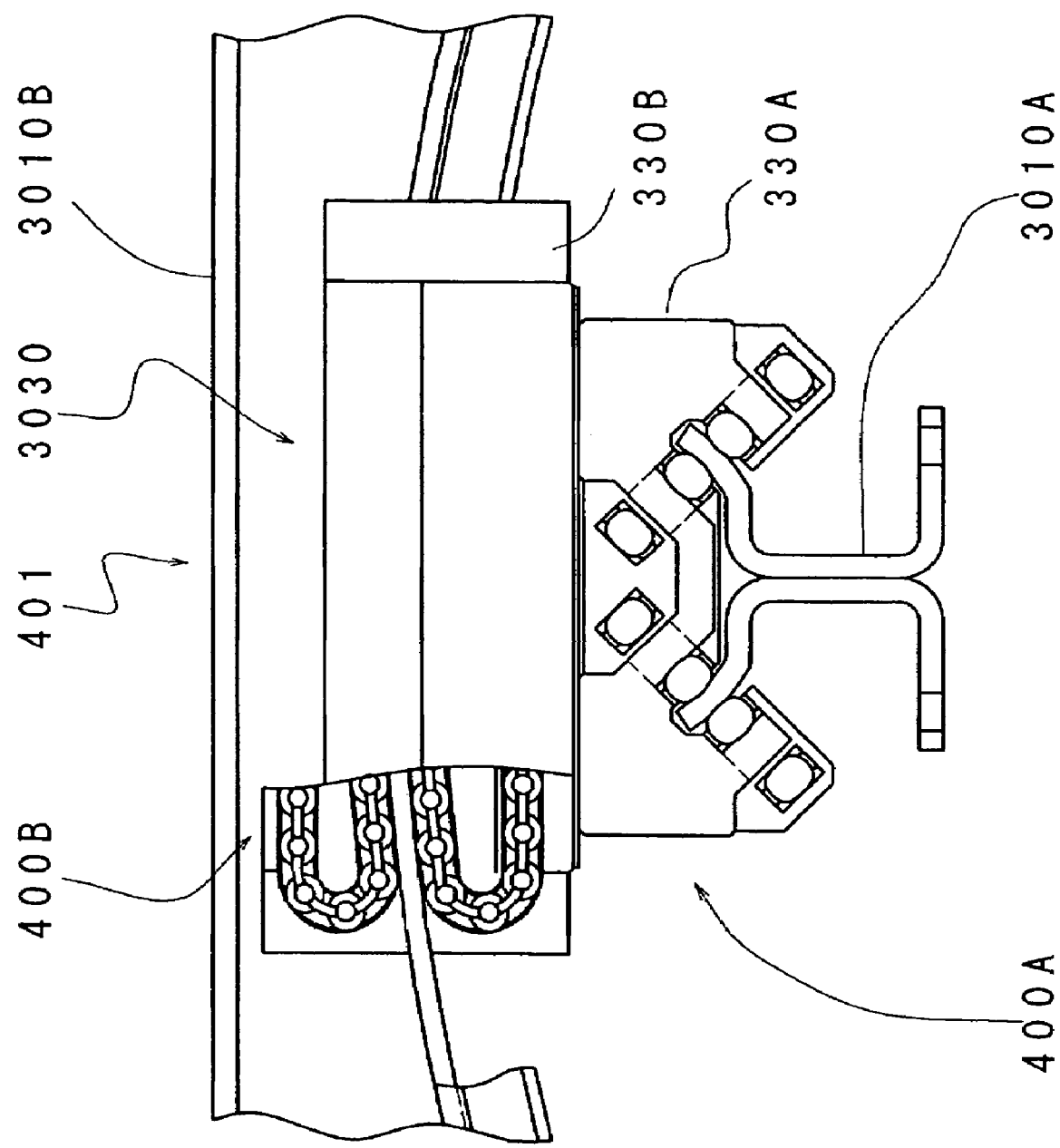
FIG. 21 is a partially broken front elevation view of a rolling guide apparatus according to a fourth embodiment of the present invention.

FIG. 21 shows a rolling guide apparatus according to a fourth embodiment of the present invention.

In this fourth embodiment, the rolling motion guide apparatus has two axes combined to be orthogonal to each other so as to be movable in every direction.

That is, two sets of curvilinear rolling guide apparatuses according to the above-mentioned third embodiment are arranged in a vertically opposite relation with respect to each other, with the respective track rails 3010A, 3010B being disposed orthogonal to each other, and two movable blocks 330A, 330B are integrated with each other in back-to-back contact to form a single movable block unit 3030. Here, note that the term "integrated" includes the case in which the two separate movable blocks 330A, 330B are integrally coupled with each other by means of bolts or the like, and the case in which they are integrally molded with each other from one seamless material. Among the indexes or characters A, B attached to the numerals, A represents a lower structure whereas B represents an upper structure.

That is, this biaxial rolling guide apparatus 401 comprises a lower first motion guide portion 400A, and an upper second motion guide portion 400B that performs a guiding operation in a direction orthogonal to that of the lower first motion guide portion 400A. The construction of the lower first motion guide portion 400A is quite the same construction as the above-mentioned third embodiment, and hence its detailed description is omitted while quoting the explanation of the third embodiment. The upper second motion guide portion 400B is different from the lower first motion guide portion 400A only in the upside-down or vertically opposite arrangement and in that the directions of the pair of track rails 3010, 3010 are arranged orthogonal to each other, but the basic structures thereof are quite the same with each other.

Particularly, in this embodiment, in cases where the biaxial rolling guide apparatus of this embodiment is used as an aseismatic or quake-free device of a comparatively light building such as an ordinary house or the like, the lower track rail 3010A is fixedly secured to an unillustrated foundation floor or footing, and the building is fixed to the other upper track rail 3010B, so that the building is moved, under the action of seismic vibrational energy, in horizontal directions along the track rails 3010A, 3010B arranged one over the other. In this case, however, since each of the track rails 3010A, 3010B takes a circular arc configuration curving in the vertical direction, the building is lifted upwardly as it moves from a lowermost position in the direction of vibration, whereby the kinetic energy of the building is converted into its potential energy, as a result of which the movement of the building is stopped, and the building is returned by gravitation to its initial position. After repeating such a pendulum motion several times, the building stops at the lowermost positions of the track rails 3010A, 3010B.

Since the track rails 3010A, 3010B curve in the vertical direction, when the movable block unit 3030 is moving along one track rail 3010A, it will be inclined laterally or to the left or right with respect to the other track rail 3010B. In the case of a biaxial rolling guide apparatus provided with conventional or prior art rack rails of high rigidity, it is necessary to interpose a universal joint between the upper and lower movable blocks 330A, 330B, but in the case of the present invention, such an inclination can be absorbed due to the flexibility of the track rails 3010A, 3010B. Though the curvatures of the track rails 3010A, 3010B are described in the drawings in an exaggerated manner, the actual degrees of curvatures thereof are limited and can be accommodated in a satisfactory manner.

Figure 22:
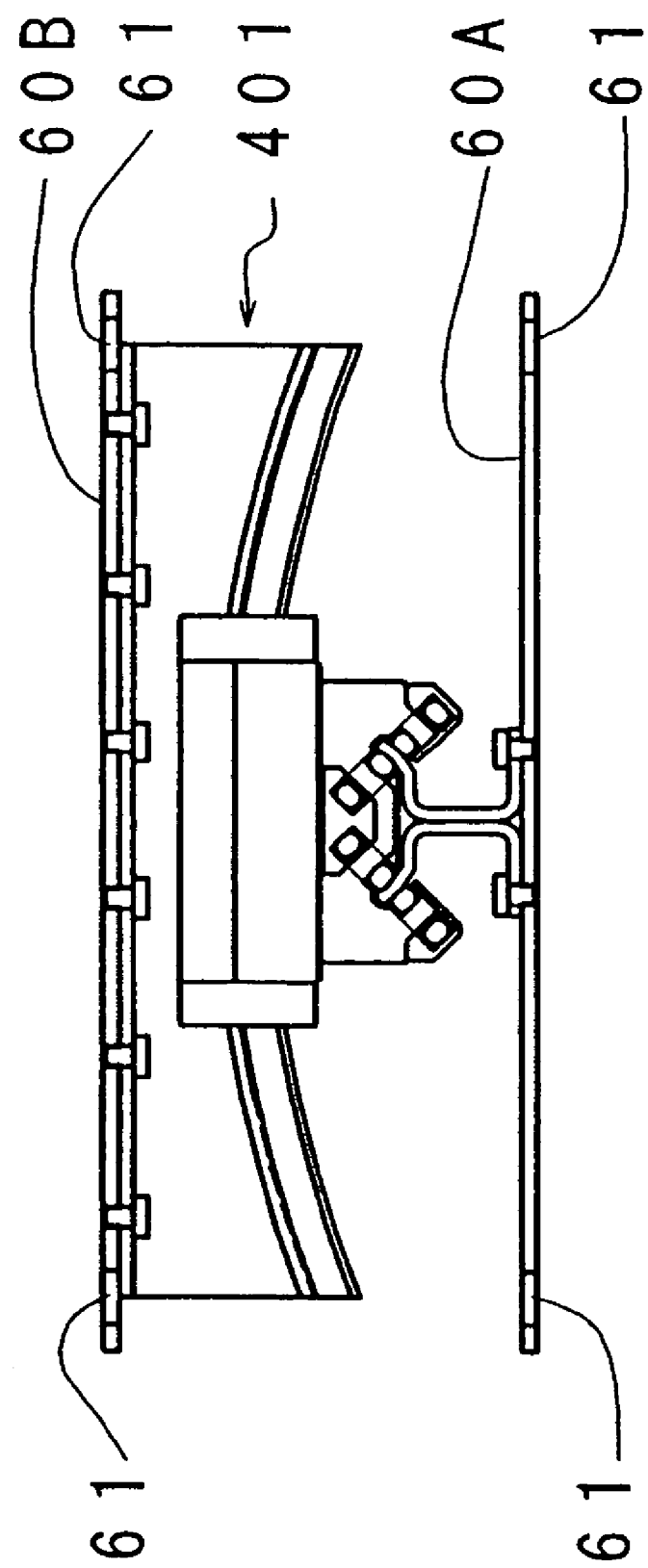
FIG. 22 is a front elevation view with mounting plates being assembled to the apparatus of FIG. 21.
Figure 23:
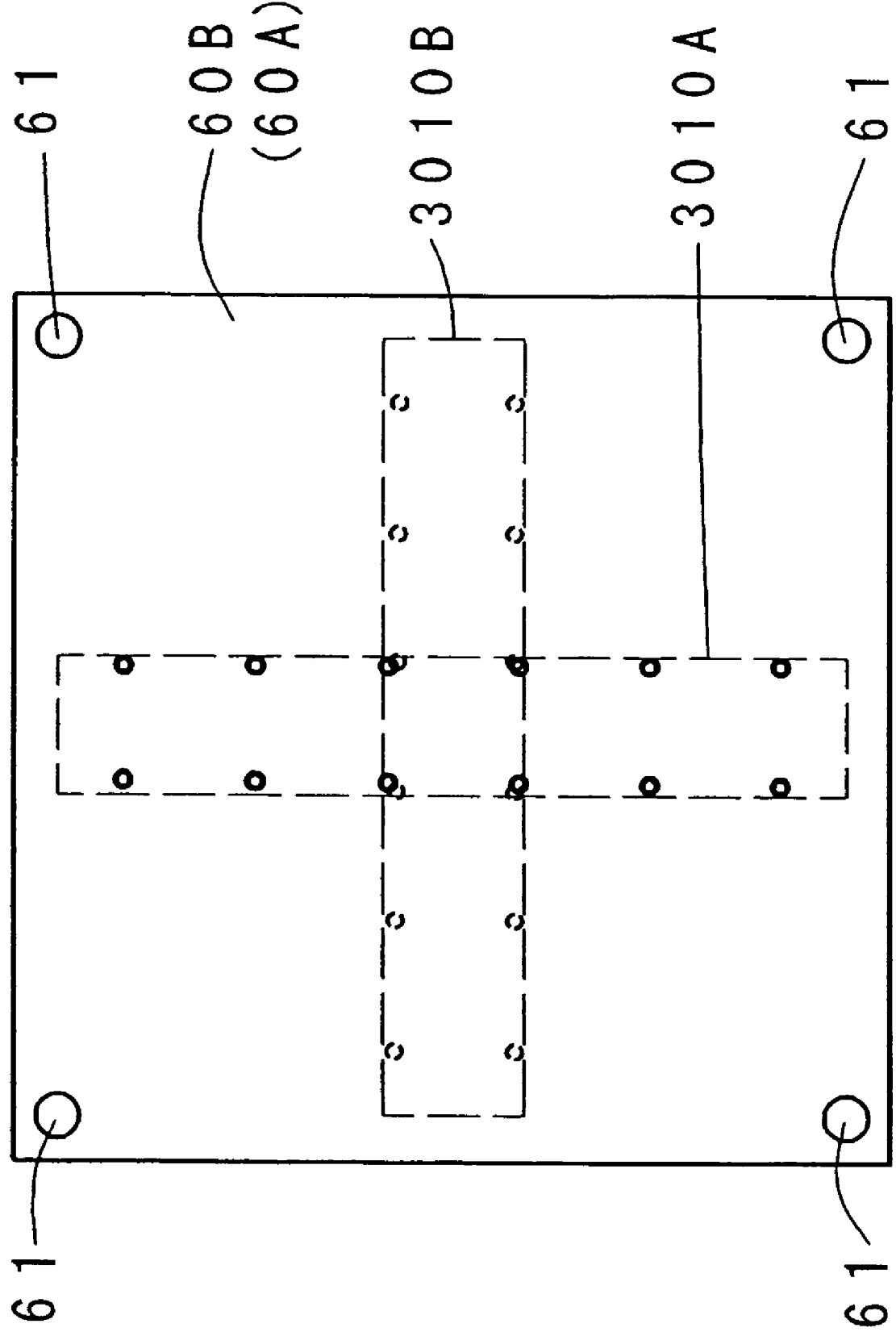
FIG. 23 is a plan view of FIG. 22.

With this rolling guide apparatus, too, as shown in FIG. 22 and FIG. 23, it is fixedly secured to a pair of mounting plates 60A, 60B made of sheet steel, etc., and the mounting plate 60A is mounted on a base or foundation, whereas the mounting plate 60B is mounted on a post (pillar) located at the bottom of a building.

Each of the mounting plates 60A, 60B has mounting bolt holes 61 at four corners thereof, and a central portion of each mounting plate, to which the track rails 3010A, 3010B are attached, can be deformed elastically in the vertical direction with their mounting portions at the four corners being made as a fulcrum. Thus, when subjected to an impact, the mounting plates 60A, 60B themselves also deform elastically. whereby an impact absorbing effect is increased in cooperation with the elastic deformation of the projected portions of the track rails 3010A, 3010B.

Regarding fields of application of the rolling guide apparatus according to the present invention, it becomes possible to apply the present invention to those parts, in which conventional rolling guide apparatuses could not been used, such as an aseismatic guiding mechanism in relatively light-weight buildings such as ordinary houses, a guiding mechanism for structural objects such as cars, aircrafts or the like that are able to move at high speed and are apt to undergo substantial deformation upon receipt of an impact load, and so on.

For instance, in the case of an aircraft, provision can be made for an apparatus for absorbing an impact or shock on each seat. That is, seats are movably mounted on a floor surface by the use of rolling guide apparatuses of the present invention, respectively, in such a manner that upon application of a prescribed impact or shock, each seat is moved to absorb the impact or shock by means of a spring, a hydraulic shock absorbing mechanism, or the like. In this case, however, conventional track rails of high rigidity are heavy weight and hence unsuitable for use with aircrafts, and even if mounted at all, shock absorbing mechanisms can not work properly. This is because the floor surface of an aircraft is always subjected to deformation so that the parallelism between the mounting surface of each track rail and the mounting surface of each movable block is always caused to change, thereby precluding smooth operations of conventional rolling guide apparatuses. In contrast, in cases where rolling motion guide apparatuses of the present invention are used, even if the floor surface is deformed, track rails themselves can be deformed following such floor surface deformation, whereby the contact portions of rolling members are always kept proper so as to guide the seats in a light and smooth manner, thus permitting shock absorbing mechanisms to function in a satisfactory manner.

As described in the foregoing, according to the invention related to claim 1, a track rail has an elastically deformable flexible structure comprising; a thin central plate portion being elastically deformable to the left or right; thin projected portions projecting to the left and right from an upper end portion of the central plate portion and being flexibly deformable in a vertical direction; and fixed plate portions projecting to the left and right from a lower end portion of the central plate portion. With this construction, in comparison with a conventional track rail of a rigid structure, the track rail of the prevent invention having an elastically deformable flexible structure is reduced in weight and cost, and still has a high impact or shock absorbing effect as well as a self-aligning capability to absorb some parallelism error between mounting surfaces. For instance, though an impact of 3G can be decreased to 2G or so in the past, the present invention can reduce such an impact of 3G to about 1G. Thus, if the impact can be reduced to one-half, the rated load of the rolling members can be reduced to one-half.

For fields of application, the present invention can be applied to those parts, in which conventional rolling guide apparatuses could not been used, such as an aseismatic guiding mechanism in relatively light-weight buildings such as ordinary houses, a guiding mechanism for structural objects such as cars, aircrafts or the like that are able to move at high speed and are apt to undergo substantial deformation upon receipt of an impact load, and so on.

If a track rail is formed by welding together the back sides of the bottom plate portions of a pair of rail members each having a channel-shaped cross sectional configuration, it is possible to use inexpensive press-molded products, thus achieving cost reduction.

Integral formation of a track rail by drawing serves to simplify a molding process step though the rigidity thereof becomes somewhat higher.

If a track rail is composed of a cover plate molded from precision sheet steel into a circular arc shape, and a base member welded by electrodeposition to the cover plate, it becomes unnecessary to form track grooves by grinding since the precision of the cover plate is high.

In addition, two rolling guide apparatuses are arranged in a vertically opposite relation with respect to each other, with respective track rails thereof being disposed orthogonal to each other, and two movable blocks thereof are integrally coupled with each other in back-to-back contact so as to be movable in two axial directions. With such an arrangement, it is possible to achieve a light-weighted guide apparatus capable of moving in every direction as well as absorbing an impact load acting thereon.

Furthermore, if upper and lower track rails are fixedly secured to the centers of mounting plates, respectively, to form a unit, with the end portions of the mounting plates being fixed to counterpart mounting surfaces, when subjected to an impact, the mounting plates themselves also deform elastically to provide a great impact absorbing effect in cooperation with elastic deformation of projected portions of the track rails.

If the mounting plates are fixedly secured to the upper and lower track rails, respectively, handling of the apparatus becomes easy.

If a track rail comprises a rectilinear rail, the apparatus can be applied to various guiding portions.

Particularly, if a track rail comprises a curvilinear rail curving in a vertical direction, the apparatus becomes suitable for a guiding mechanism of a seismic isolator.

The invention claimed is:

1. A rolling guide apparatus comprising:

a track rail comprising a central plate portion, first and second rolling member contact plates projecting outwardly from said central plate portion, and first and second fixed plates projecting outwardly from said central plate portion, each of said rolling member contact plates having a horizontal portion located at a root side adjacent the central plate portion and an inclined arcuate portion located at a projecting side opposite said root side, each of the horizontal portions having an exposed horizontal upper surface an an exposed horizontal lower surface, each of the inclined arcuate portions curving to a height further from the fixed plates than the horizontal portions; and a movable block having at least four sets of endlessly circulating rolling member rows built therein which are in rolling contact with at least two surfaces of said first and second rolling member contact plates of said track rail, wherein said central plate portion is elastically deformable by forces placed on said rolling member contact plates and said fixed plates.

2. The rolling guide apparatus as set forth in claim 1, wherein said track rail is formed by welding together back sides of bottom plate portions of a pair of rail members each having a channel-shaped cross sectional configuration.

3. The rolling guide apparatus set forth in claim 1, wherein said track rail is formed into an integral structure by drawing.

4. The rolling guide apparatus as set forth in claim 1, wherein said track rail comprises a rectilinear rail.

5. The rolling guide apparatus as set forth in claim 1, wherein said track rail comprises a curvilinear rail curving in a vertical direction.

6. The rolling guide apparatus as set forth in claim 1, wherein all said rolling members of said four sets of endlessly circulating rolling member rows comprise balls.

7. The rolling guide apparatus as set forth in claim 1, wherein two left and right rows of endlessly circulating rolling members located at an upper side of said rolling member contact plates comprise rollers having their rolling face portions of a circular arc configuration, and said rolling members located at a lower side of said rolling member contact plates comprise balls.

8. A rolling guide apparatus as set forth in claim 1 wherein upper and lower rolling guide apparatuses having respective upper and lower track rails are arranged in a vertically opposite relation with respect to each other with their respective track rails being disposed orthogonal to each other, and two movable blocks are coupled with each other in back-to-back contact to form an integral structure so as to be movable in two orthogonal directions.

9. The rolling guide apparatus as set forth in claim 8, wherein said upper and lower track rails are fixedly secured to centers of mounting plates, respectively, with end portions of said mounting plates being fixedly attached to counterpart mounting surfaces.

* * * * *